United States Patent
Hwang et al.

(10) Patent No.: US 12,021,617 B2
(45) Date of Patent: Jun. 25, 2024

(54) INTERLEAVING FOR CODE BLOCK

(71) Applicant: LG ELECTRONICS INC., Seoul (KR)

(72) Inventors: Daesung Hwang, Seoul (KR); Hanbyul Seo, Seoul (KR); Seungmin Lee, Seoul (KR); Uihyun Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 17/594,197

(22) PCT Filed: Apr. 9, 2020

(86) PCT No.: PCT/KR2020/004823
§ 371 (c)(1),
(2) Date: Oct. 6, 2021

(87) PCT Pub. No.: WO2020/209627
PCT Pub. Date: Oct. 15, 2020

(65) Prior Publication Data
US 2022/0158760 A1    May 19, 2022

Related U.S. Application Data

(60) Provisional application No. 62/916,215, filed on Oct. 16, 2019, provisional application No. 62/831,221, filed on Apr. 9, 2019.

(30) Foreign Application Priority Data

May 3, 2019    (KR) .................. 10-2019-0052387

(51) Int. Cl.
*H04L 1/00*      (2006.01)
*H04L 1/1867*    (2023.01)
(Continued)

(52) U.S. Cl.
CPC ............ *H04L 1/0057* (2013.01); *H04L 1/189* (2013.01); *H04L 5/0048* (2013.01); *H04W 4/70* (2018.02); *H04W 92/18* (2013.01)

(58) Field of Classification Search
None
See application file for complete search history.

(56) References Cited

U.S. PATENT DOCUMENTS

2018/0034608 A1\*  2/2018  Seo .......................... H04B 7/00
2018/0262312 A1\*  9/2018  Lee ....................... H04L 1/1812
(Continued)

FOREIGN PATENT DOCUMENTS

| KR | 20180088423 | 8/2018 |
|---|---|---|
| WO | 2017151175 | 9/2017 |
| WO | 2018144560 | 8/2018 |

OTHER PUBLICATIONS

Author Unknown, Further Enhancement of Systematic Bit Priority, Doc No. R1-1719605, pp. 1-8, Dec. 1 (Year: 2017).\*
(Continued)

*Primary Examiner* — Christopher M Crutchfield
(74) *Attorney, Agent, or Firm* — LEE, HONG, DEGERMAN, KANG & WAIMEY

(57) ABSTRACT

According to an embodiment of the present disclosure, a method for performing SL communication by a first device is provided. The method comprises the steps of: determining a plurality of first bits on which interleaving is to be performed from among a plurality of bits of a first encoded code block and a plurality of second bits except for the plurality of first bits from among the plurality of bits of the first encoded code block; performing interleaving on the plurality of first bits; transmitting, to a second device, the plurality of first bits on which the interleaving has been performed, on a plurality of first REs related to the plurality of first bits; and transmitting, to the second device, the
(Continued)

plurality of second bits on a plurality of second REs related to the plurality of second bits.

18 Claims, 34 Drawing Sheets

(51) Int. Cl.
*H04L 5/00* (2006.01)
*H04W 4/70* (2018.01)
*H04W 92/18* (2009.01)

(56) References Cited

U.S. PATENT DOCUMENTS

| 2018/0367245 | A1 | 12/2018 | Soriaga et al. |
| 2020/0127758 | A1* | 4/2020 | Khoshnevisan .... H04L 27/3488 |
| 2020/0266957 | A1* | 8/2020 | Gulati .................. H04L 1/0063 |
| 2020/0374029 | A1* | 11/2020 | Yeo ........................ H04L 1/001 |
| 2021/0259009 | A1* | 8/2021 | Chen ..................... H04B 1/713 |

OTHER PUBLICATIONS

Author Unknown, Considerations on Physical Layer aspects of NR V2X, pp. 1-20, Feb. 16 (Year: 2019).*
PCT International Application No. PCT/KR2020/004823, International Search Report dated Jul. 10, 2020, 4 pages.
Qualcomm Incorporated, "Considerations on Physical Layer aspects of NR V2X," R1-1902994, 3GPP TSG RAN WG1 Meeting #96, Mar. 2019, 20 pages.

* cited by examiner

INTERLEAVING FOR CODE BLOCK

CROSS-REFERENCE TO RELATED APPLICATIONS

This application is the National Stage filing under 35 U.S.C. 371of International Application No. PCT/KR2020/004823, filed on Apr. 9, 2020, which claims the benefit of earlier filing date and right of priority to Korean Application No. 10-2019-0052387, filed on May 3, 2019, and also claims the benefit of U.S. Provisional Application Nos. 62/831,221, filed on Apr. 9, 2019, and 62/916,215, filed on Oct. 16, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for interleaving bits related to an encoded code block and device(s) (or UE(s)) performing the method.

Technical Solutions

Based on an embodiment of the present disclosure, a method for performing sidelink (SL) communication by a first device is provided. The method may comprise: determining a plurality of first bits to be interleaved among a plurality of bits related to a first encoded code block and a plurality of second bits excluding the plurality of first bits from the plurality of bits related to the first encoded code block; performing interleaving for the plurality of first bits; transmitting, to a second device, the interleaved plurality of first bits based on a plurality of first resource elements (REs) related to the plurality of first bits; and transmitting, to the second device, the plurality of second bits based on a plurality of second REs related to the plurality of second bits.

Based on an embodiment of the present disclosure, a first device configured to perform sidelink (SL) communication is provided. The first device may comprise: at least one memory storing instructions; at least one transceiver; and at least one processor connected to the at least one memory and the at least one transceiver. The at least one processor may execute the instructions to: determine a plurality of first bits to be interleaved among a plurality of bits related to a first encoded code block and a plurality of second bits excluding the plurality of first bits from the plurality of bits related to the first encoded code block; perform interleaving for the plurality of first bits; transmit, to a second device, the interleaved plurality of first bits based on a plurality of first resource elements (REs) related to the plurality of first bits; and transmit, to the second device, the plurality of second bits based on a plurality of second REs related to the plurality of second bits.

Based on an embodiment of the present disclosure, an apparatus (or chip (set)) configured to control a first user equipment (UE) is provided. The apparatus may comprise: at least one processor; and at least one memory connected to the at least one processor and storing instructions. The at least one processor may execute the instructions to: determine a plurality of first bits to be interleaved among a plurality of bits related to a first encoded code block and a plurality of second bits excluding the plurality of first bits from the plurality of bits related to the first encoded code block; perform interleaving for the plurality of first bits; transmit, to a second UE, the interleaved plurality of first bits based on a plurality of first resource elements (REs) related to the plurality of first bits; and transmit, to the second UE, the plurality of second bits based on a plurality of second REs related to the plurality of second bits.

Based on an embodiment of the present disclosure, a non-transitory computer-readable storage medium storing instructions is provided. The instructions, when executed, may cause a first device to: determine a plurality of first bits to be interleaved among a plurality of bits related to a first encoded code block and a plurality of second bits excluding the plurality of first bits from the plurality of bits related to the first encoded code block; perform interleaving for the plurality of first bits; transmit, to a second device, the interleaved plurality of first bits based on a plurality of first resource elements (REs) related to the plurality of first bits; and transmit, to the second device, the plurality of second bits based on a plurality of second REs related to the plurality of second bits.

Based on an embodiment of the present disclosure, a method for performing sidelink (SL) communication by a second device is provided. The method may comprise: receiving, from a first device, a plurality of first bits based on a plurality of first resource elements (REs) related to the plurality of first bits; and receiving, from the first device, a plurality of second bits based on a plurality of second REs related to the plurality of second bits, wherein the plurality of first bits are a plurality of bits interleaved by the first device among a plurality of bits related to a code block encoded by the first device, and wherein the plurality of second bits are a plurality of bits excluding the plurality of first bits from the plurality of bits related to the code block encoded by the first device.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: receive, from a first device, a plurality of first bits based on a plurality of first resource elements (REs) related to the plurality of first bits; and receive, from the first device, a plurality of second bits based on a plurality of second REs related to the plurality of second bits, wherein the plurality of first bits are a plurality of bits interleaved by the first device among a plurality of bits related to a code block encoded by the first device, and wherein the plurality of second bits are a plurality of bits excluding the plurality of first bits from the plurality of bits related to the code block encoded by the first device.

Effects of the Disclosure

Based on the present disclosure, V2X communication between devices (or UEs) can be efficiently performed.

Based on the present disclosure, the puncturing effect by the automatic gain control (AGC) period and/or the power reduction effect of a physical sidelink control channel (PSCCH) due to frequency-division multiplexing (FDM) between the PSCCH and a physical sidelink shared channel (PSSCH) can be uniformly applied to all or part of code blocks.

DESCRIPTION OF EXEMPLARY EMBODIMENTS

Figure 1:
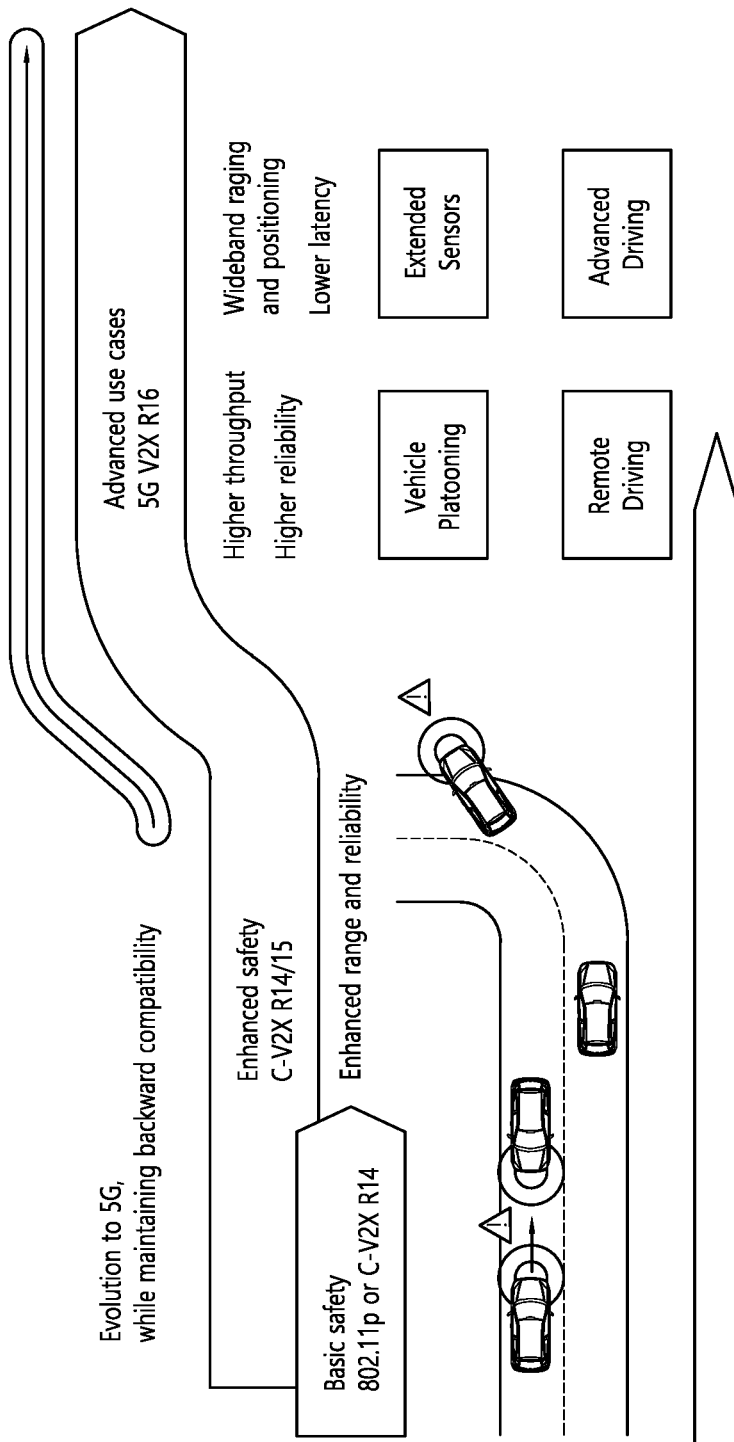
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
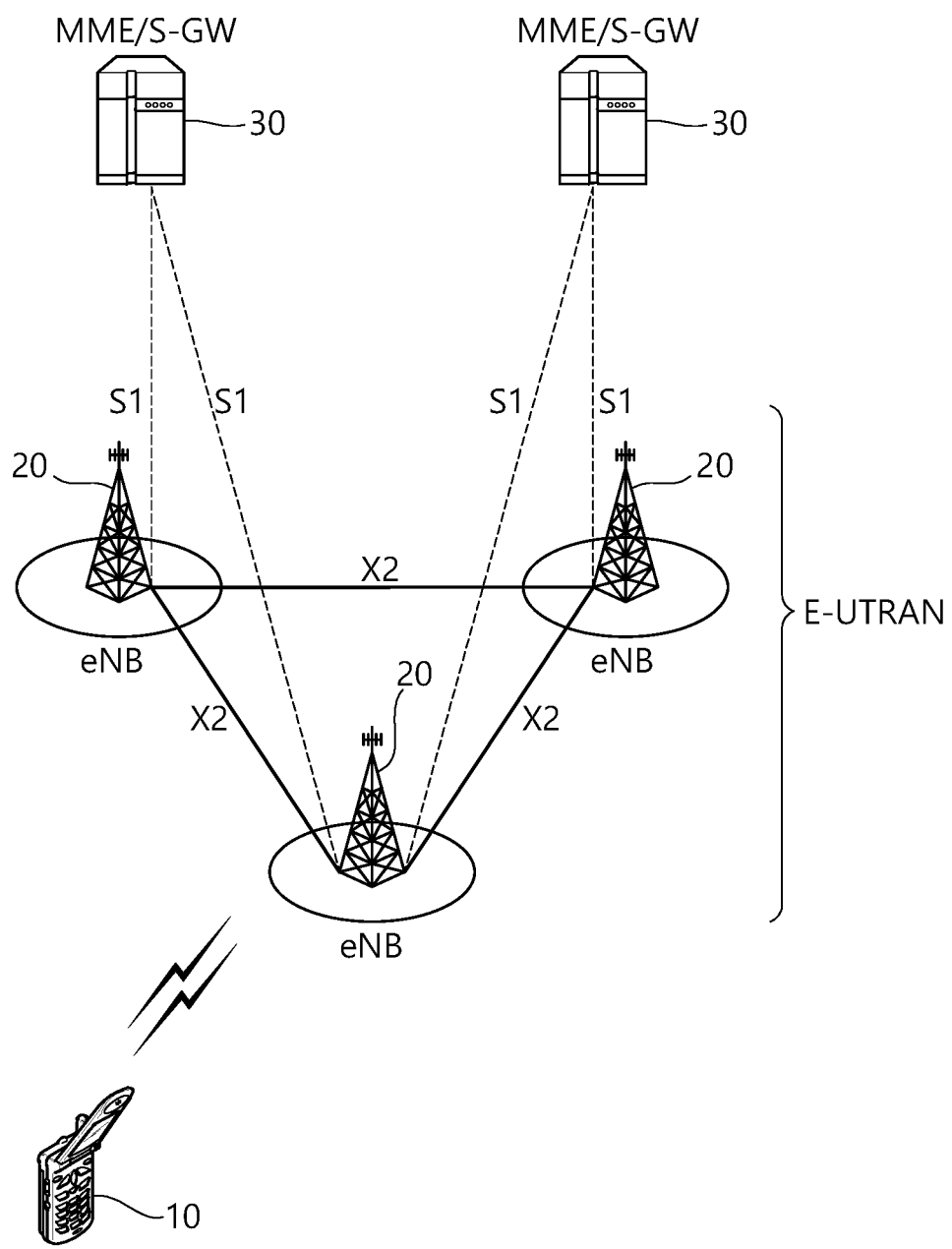
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
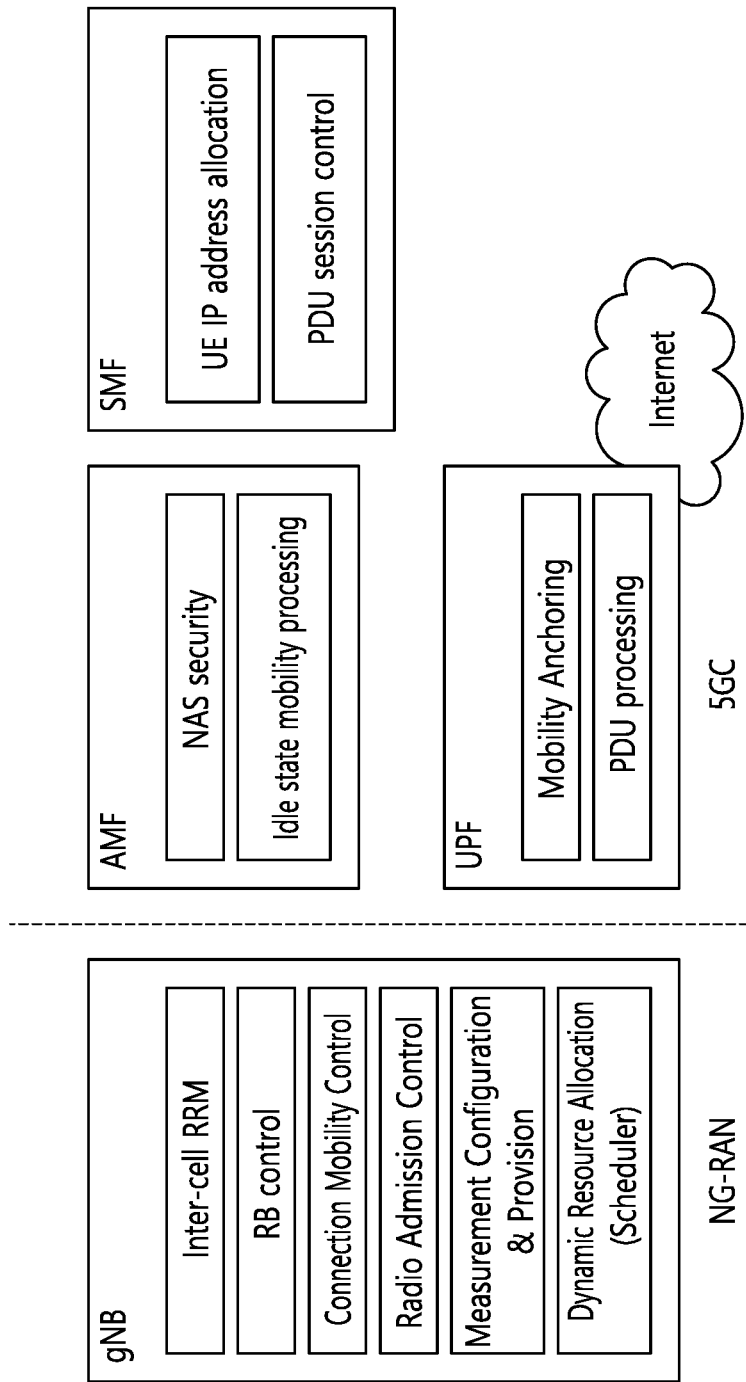
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
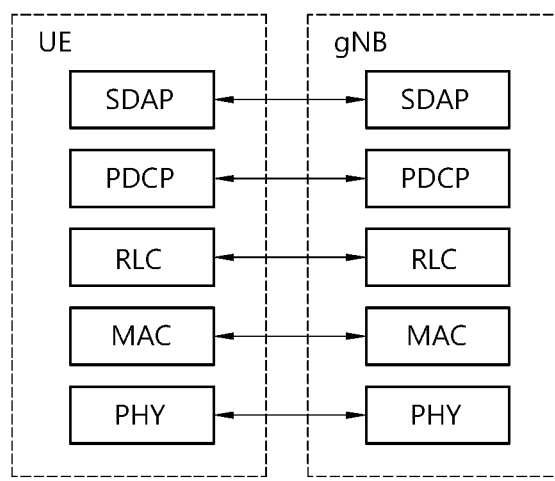
FIGS. 4A and 4B show a radio protocol architecture, based on an embodiment of the present disclosure.
Figure 4B:
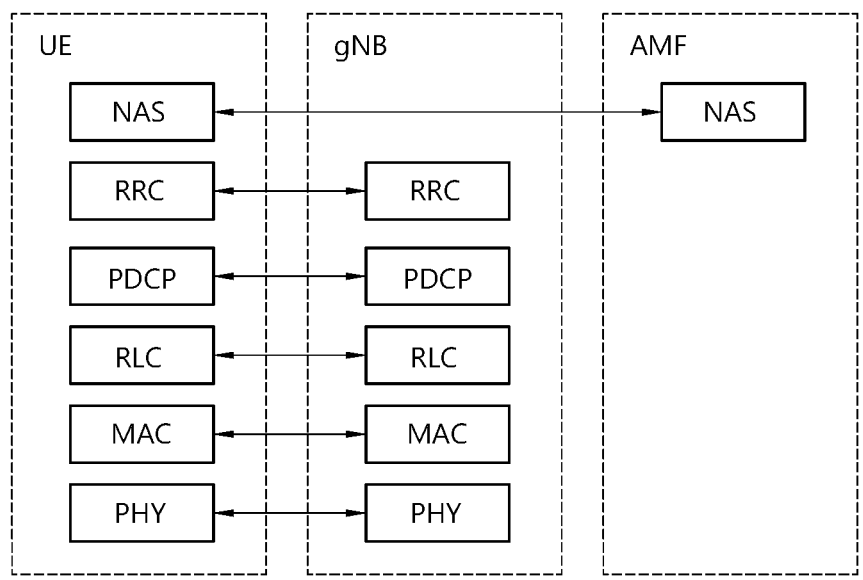

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
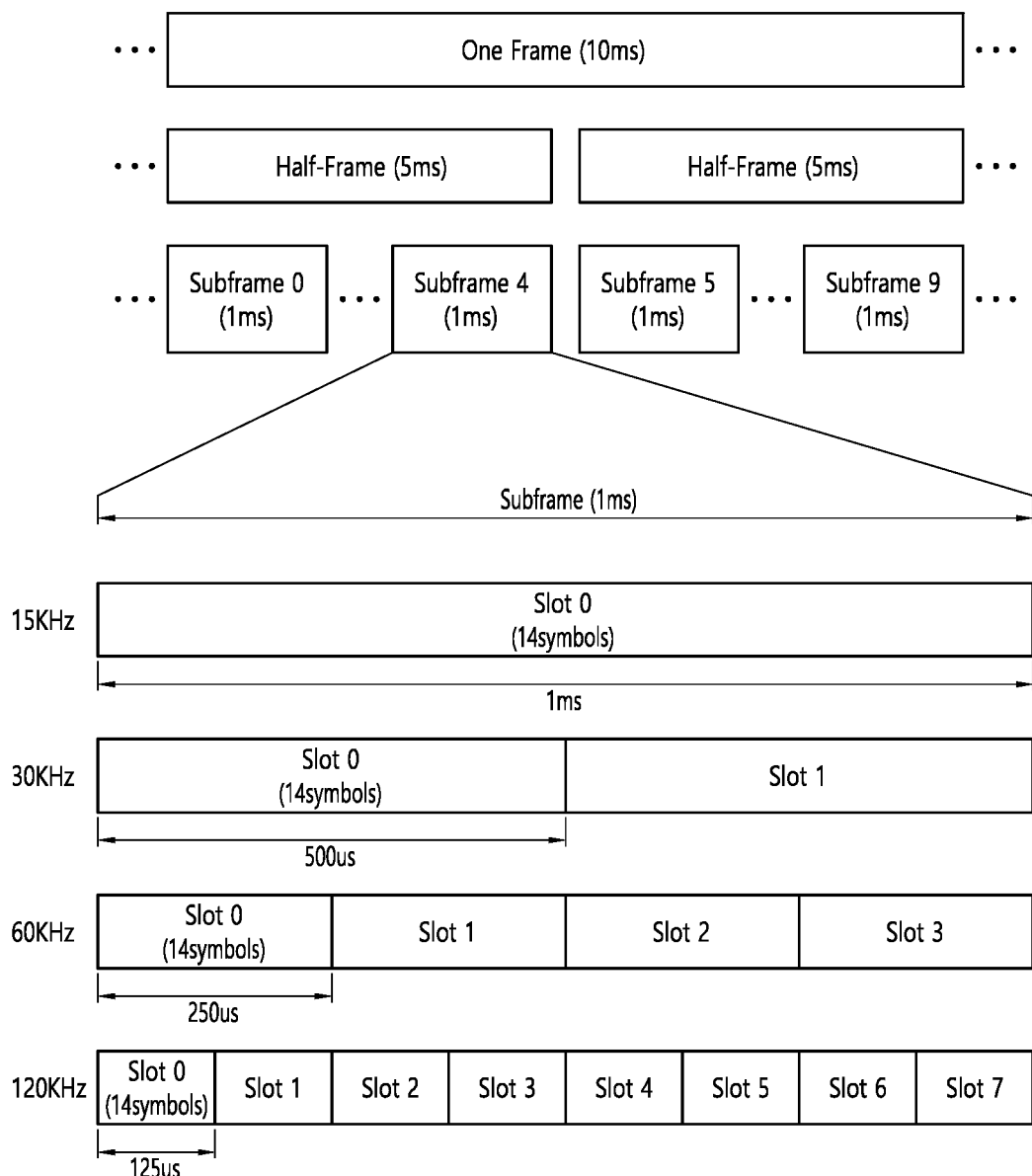
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 2) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
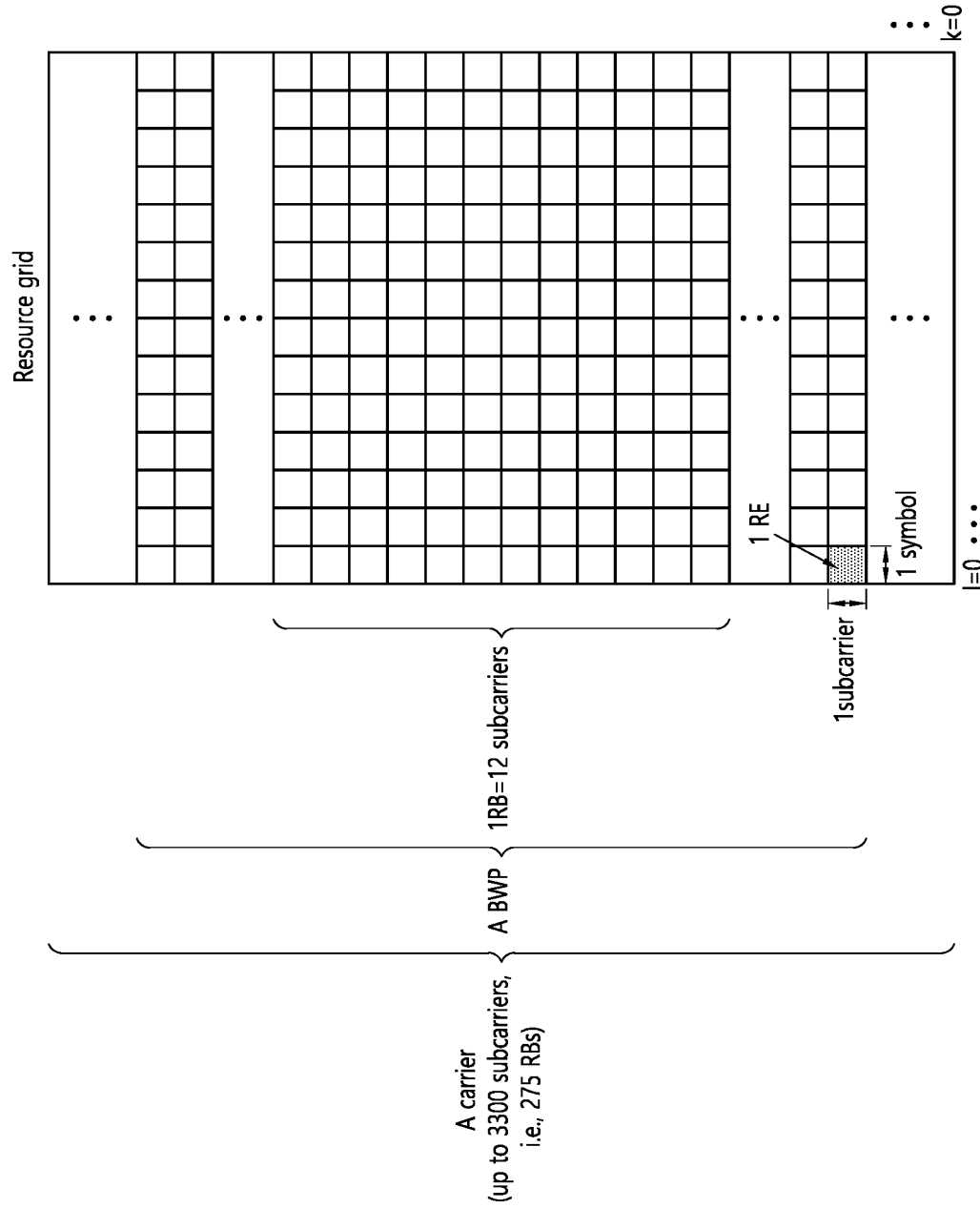
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the B S/network configures the BWP to the UE and the B S/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
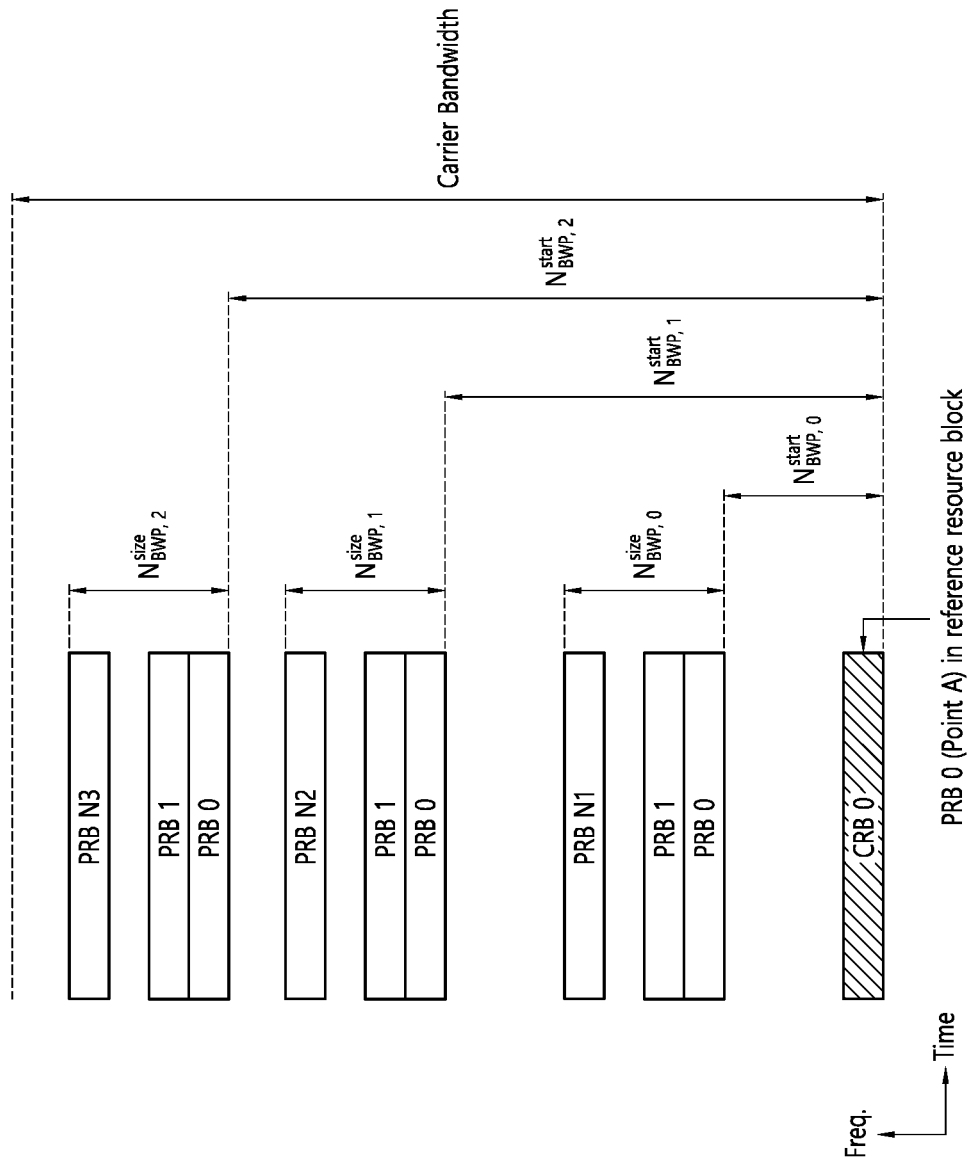
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
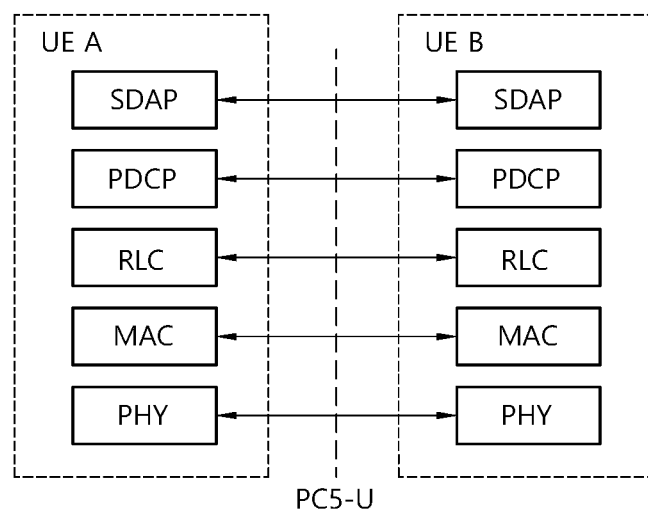
FIGS. 8A and 8B show a radio protocol architecture for a SL communication, based on an embodiment of the present disclosure.
Figure 8B:
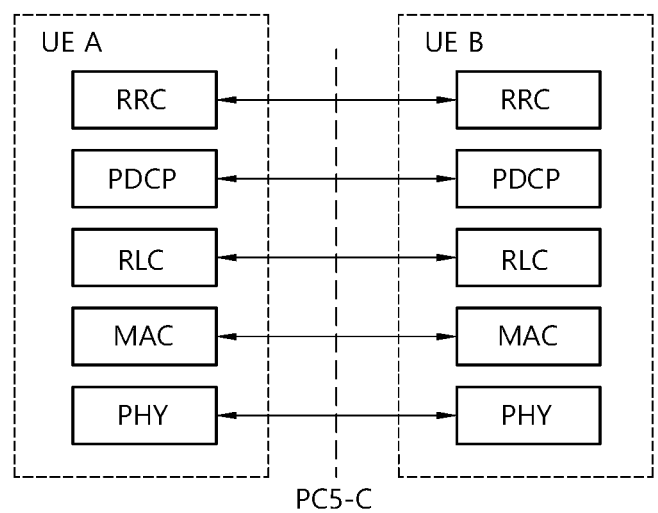

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
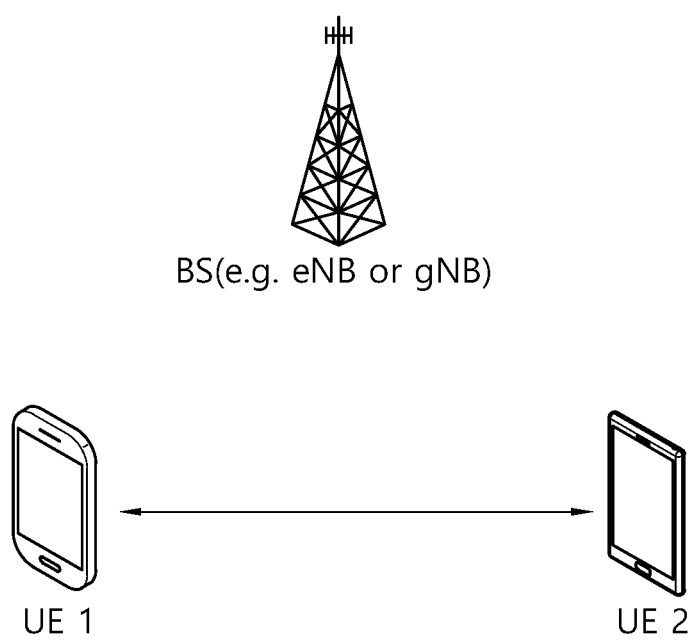
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
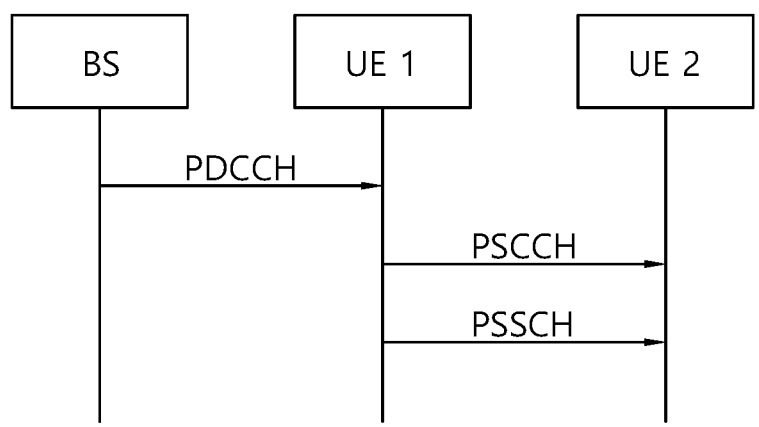
FIGS. 10A and 10B show a procedure of performing V2X or SL communication by a UE based on a transmission mode, based on an embodiment of the present disclosure.
Figure 10B:
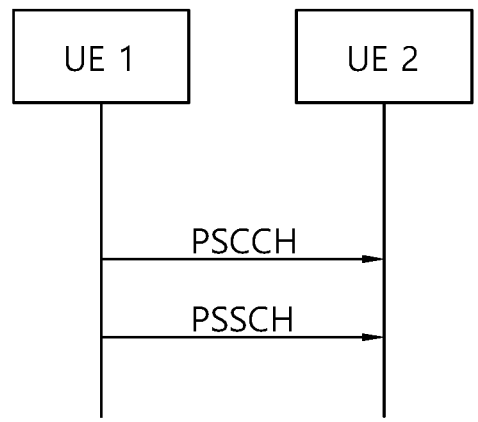

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
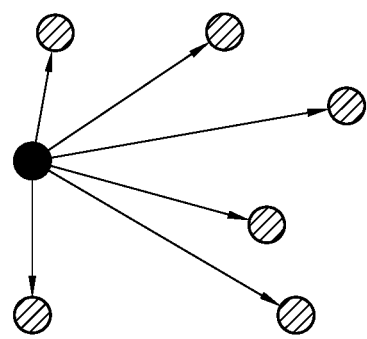
FIGS. 11A to 11C show three cast types, based on an embodiment of the present disclosure.
Figure 11B:
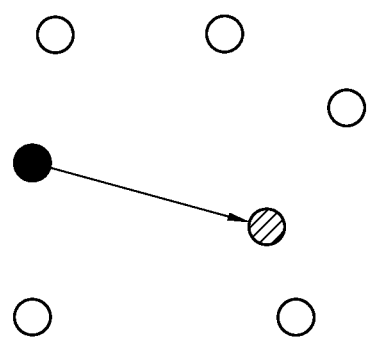
Figure 11C:
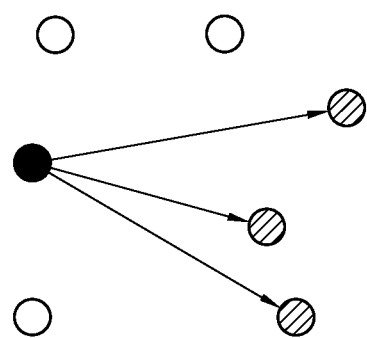

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on).

In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Meanwhile, when transmitting and/or receiving between UEs through SL in wireless radio access technology (RAT) based on an embodiment, a layer-1 ID (e.g., layer-1 source ID and/or layer-1 destination ID) may be determined based on a service type, a type of a UE, a situation of a UE (e.g., location information of a UE), a type of transmission/reception packet(s), and/or configuration(s) at an application level, etc. The layer-1 ID may be inherited or extracted from a higher layer ID, and may be used to distinguish a transmitting UE and/or a receiving UE when transmitting and receiving between UEs through SL.

More specifically, the layer-1 destination ID may be used to identify a UE requiring reception of a PSCCH and/or a PSSCH transmitted through SL. For example, if the layer-1 destination ID is transmitted through the PSCCH, the UE not corresponding to the layer-1 destination ID may not require decoding of the PSSCH. The layer-1 source ID may be used by the receiving UE to distinguish the transmitting UE. For PSCCH and/or PSSCH transmission(s) with potentially the same layer-1 destination ID, whether the corresponding transport block (TB) are the same or different may be distinguished based on the layer-1 source ID. In addition, it may be to perform suitable HARQ combining for the TB.

In the wireless RAT based on an embodiment, when transmitting or indicating layer-1 IDs through SL, in consideration of signaling overhead, it is considered that layer-1 IDs are smaller in size than higher layer IDs (e.g., layer 2 IDs). For example, the size of each layer-1 ID may be 8 bits or 16 bits. If the size of each layer-1 ID is 8 bits or 16 bits, a situation in which the layer-1 source/destination ID combinations are the same or collide may occur even in a situation in which the upper layer source/destination ID combinations are different. Meanwhile, in order to reduce the higher signaling overhead, when indicating or transmitting the layer-2 ID, in consideration of the amount transmitted through the layer-1 ID, it may be considered to separately transmit (e.g., through a MAC CE message, etc.) information not represented by the layer-1 ID or additional required amount of information.

Meanwhile, in the wireless RAT based on an embodiment, a SCI transmitted through a PSCCH may be coded based on polar coding after CRC attachment (e.g., 24-bit CRC). In the polar coding, some bits of the CRC (e.g., 8 bits of MSB) may be used for decoding, and in this case, performing masking on some bits of the corresponding CRC may greatly increase decoding complexity. Considering the resource selection process in SL, the SCI transmitted through the PSCCH may be decoded and/or received by at least all UE. If all UEs can decode and/or receive the SCI, the receiving UE may consider excluding resource(s) determined by scheduling of other UE(s) when selecting future resource(s).

Meanwhile, in the wireless RAT based on an embodiment, the SCI may be divided into a first SCI (1st SCI) and a second SCI (2nd SCI) and transmitted. For example, the first SCI may be decoded and/or received by all UEs in consideration of resource selection or sensing operation, and the second SCI may be required to be decoded and/or received for a specific UE. For example, the first SCI may include a layer-1 destination ID.

Hereinafter, based on an embodiment of the present disclosure, a method of transmitting a layer-1 ID, a method of configuring related information to be transfer to a layer 2 in order to transfer a layer-2 ID, and an apparatus supporting the same are proposed. In the embodiments based on the present disclosure, for convenience of description, it is assumed that the layer-1 destination ID composed of 8 bits or 16 bits is indicated through the first SCI. The following is a more specific example of layer-1 ID information transmitted through the second SCI.

For example, the UE may perform CRC masking for the CRC for the second SCI and/or perform data scrambling for the coded bits for the second SCI, by using the layer 2-destination ID or information corresponding thereto, which is not represented by the layer-1 destination ID. Herein, the masking may be scrambling based on a specific sequence with respect to the generated CRC. More specifically, the 8 bits layer-1 destination ID may be transmitted as contents of the first SCI, and the remaining 16 bits destination ID may be transmitted through CRC masking of the second SCI. Through this, the collision between layer-1 destination IDs can be mitigated and/or avoided by CRC masking of the second SCI. In this case, the layer-1 source ID may be transmitted as contents of the first SCI or the second SCI. In addition, the layer-2 source ID or information corresponding thereto, which is not represented by the layer-1 source ID, may be transmitted to the receiving UE through a PSSCH or a MAC CE message.

For example, contents of the second SCI may include a layer-1 source ID, and the UE may perform CRC masking with respect to the CRC of the second SCI by using a layer-2 source ID or information corresponding thereto, which is not represented by the layer-1 source ID. More specifically, the 8 bits layer-1 source ID may be transmitted as contents of the second SCI, and the remaining 16 bits source ID may be transmitted through CRC masking of the second SCI. The advantage of the above scheme lies in mitigating and/or avoiding collisions between layer-1 source IDs with CRC masking of the second SCI. In this case, the layer-2 destination ID or information corresponding thereto, which is not represented by the layer 1-destination ID, may be transmitted to the receiving UE through a PSSCH or a MAC CE message.

Meanwhile, in the case of information transmission through CRC masking, a process of extracting information transmitted through de-masking at the receiving UE may be required. In this case, if the number of sequences to be demasked is large, the CRC may not operate properly (e.g., false alarm generation, etc.). That is, in order for the demasking to operate, a set of source IDs that can be received by the receiving UE may need to be defined or determined in advance. If unicast and/or connection-oriented groupcast is considered, it may be assumed that the receiving UE knows the source ID in advance, and in this case, transmission of the source ID through CRC masking can operate effectively. On the other hand, if session management is not guaranteed, such as connection-less groupcast or broadcast, the source ID expected by the receiving UE may not be guaranteed as well, which means that information transfer through CRC masking does not work effectively.

Therefore, with respect to the CRC of the second SCI, CRC masking may be performed based on (a set of) specific value(s) or (a set of) sequence(s) when scheduling a PSSCH corresponding to groupcast, groupcast without a connection, or broadcast. For example, when CRC masking is not performed or when CRC masking is performed with a sequence in a specific sequence set, the receiving UE may implicitly recognize whether the corresponding PSSCH scheduling corresponds to groupcast or broadcast. More specifically, a sequence or a corresponding set used for CRC masking may be different for each groupcast, connectionless groupcast, or broadcast. For example, the set of sequences that can be used for CRC masking for the groupcast, connectionless groupcast, and/or broadcast may be configured differently based on a service type and/or a QoS parameter and/or a service requirement and/or (layer-1) destination ID, etc. The source ID corresponding to (a set of) the specific sequence(s) may not be used for unicast. If CRC masking is performed based on the specific sequence(s), or if the SCI or the second SCI corresponds to groupcast, connectionless groupcast and/or broadcast, the layer-2 source ID or information corresponding thereto, which is not represented by the layer-1 source ID, may be transmitted to the receiving UE through a PSSCH or a MAC CE message.

In another method, CRC masking for the CRC for the second SCI may be performed based on indication information for distinguishing cast (e.g., unicast, broadcast, or groupcast (connectionless groupcast and/or connection-oriented groupcast)) and/or indication information for distinguishing contents or a format of the second SCI.

In the present disclosure, the method of transmitting or indicating the layer-1 ID for inter-UE communication through SL is only an embodiment, and even when transmitting or indicating the layer-1 ID from a base station to a UE or from a UE to a base station, embodiments of the present disclosure may be extended and applied. In addition, the size of the bit mentioned in the embodiments of the present disclosure is merely an example, and embodiments of the present disclosure may be extended and applied to other values or combinations may be applied.

Meanwhile, in the embodiments of the present disclosure, the 8 bits layer-1 ID are transmitted as contents of the SCI, and the remaining 16 bits higher layer ID are transmitted through CRC masking. This is to minimize decoding performance for polar coding for the SCI. However, depending on the implementation, more than 8 CRC bits among the 24 bits CRC may be used for decoding, and in this case, it may be necessary to adjust the amount of information transmitted through CRC masking. More specifically, in the case of a UE with a small number of (unicast and/or connection-oriented groupcast) sessions, 16 bits may be transmitted as CRC masking intactly. On the other hand, in the case of a UE with a large number of (unicast and/or connection-oriented groupcast) sessions, the amount of information that can be transmitted through CRC masking may be less than 16 bits (e.g., 8 bits). Meanwhile, SCI detection performance may need to be further improved depending on service requirements, and even in the above situation, the amount of information that can be transmitted through CRC masking may be less than 16 bits. The following is a specific example of a method of controlling an amount that can be transmitted through CRC masking.

For example, the amount that can be transmitted through CRC masking may be configured based on PC5-RRC or the like. If the amount is configured to be smaller than 16 bits, the remaining (source and/or destination) ID information that is not transmitted to SCI contents and/or CRC masking sequence(s) may be transmitted through a MAC CE message.

In another example, the length of the CRC masking sequence or the amount of information that can be transmitted through CRC masking may be implicitly configured based on information exchanged through PC5-RRC (e.g., service requirements, service types, and/or the number of (unicast and/or connection-oriented groupcast) sessions maintained by the receiving UE, and so on). More specifically, if the number of sessions established for the receiving UE or the number of source IDs expected to be received is M or less, 16 bits CRC masking sequence(s) may be assumed, and otherwise, 8 bits CRC masking sequence(s) may be assumed.

According to some embodiments of the present disclosure, the UE can effectively transmit the layer-1 IDs to other UE(s).

Meanwhile, in the NR SL communication environment, a receiving UE may use at least one start OFDM symbol for automatic gain control (AGC). In communication with a base station, since there is periodically transmitted cell specific reference signal(s) (CRS(s)), the separate AGC period is unnecessary. However, for example, in SL communication or V2X communication, there is no reference signal that is repeatedly transmitted such as cell-specific reference signal(s). Therefore, in order to reduce the influence of fluctuations in an average power of SL signals, the AGC period needs to be included in initial transmission of SL signal(s). However, the receiving UE may not be able to use at least one symbol corresponding to the AGC period for PSSCH decoding.

Figure 12:
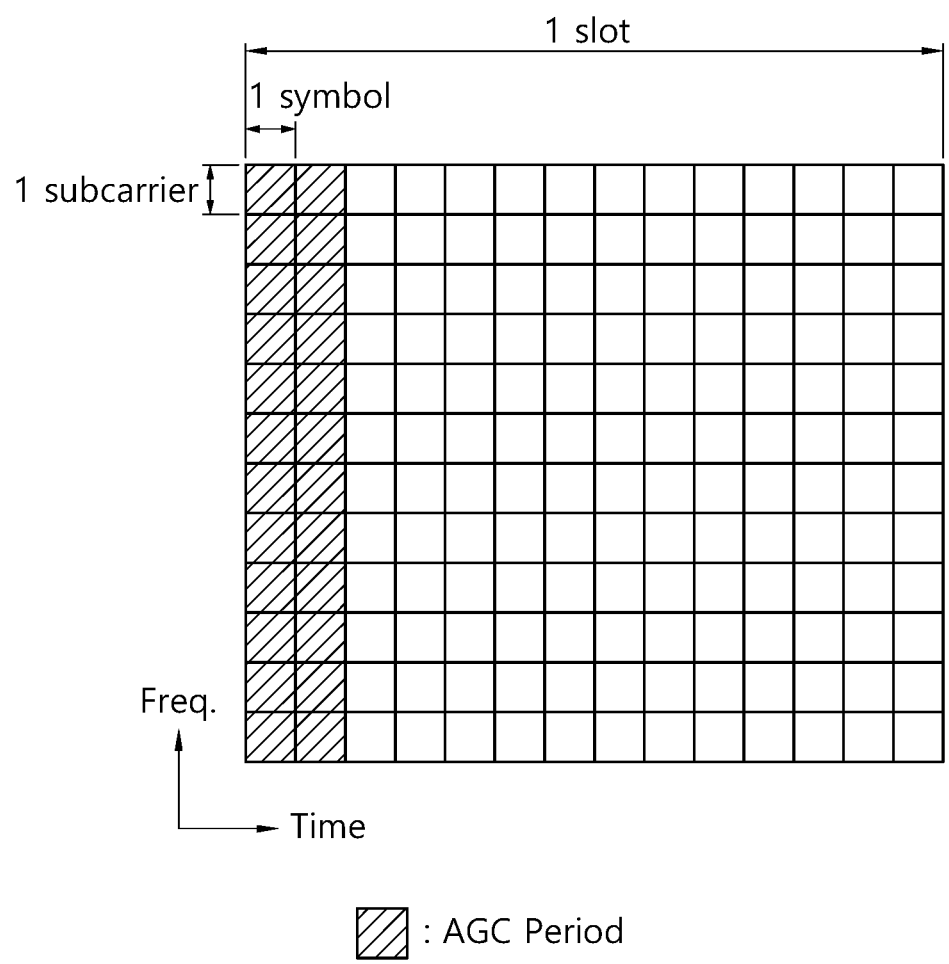
FIG. 12 shows an example of an AGC period.

FIG. 12 shows an example of an AGC period.

Referring to FIG. 12, at least one symbol may be configured for AGC. In the embodiment of FIG. 12, the AGC period may be two symbols. However, the technical idea of the present disclosure is not limited thereto, and the receiving UE may configure one or more symbols as the AGC period.

Meanwhile, a transport block (TB) that can be transmitted through a PSSCH may be transmitted by being segmented into a plurality of code blocks according to a code rate and/or the size of the transport block. That is, a transmitting UE may divide a transport block to be transmitted through the PSSCH into a plurality of code blocks. For example, the transmitting UE may attach CRC to the transport block to be transmitted through the PSSCH, and divide a block including the transport block and the CRC into a plurality of code blocks.

A transmitting UE may perform low density parity check (LDPC) encoding for each code block, and each code block may be converted into bit sequences including systematic bits and parity bits. For example, the transmitting UE may attach CRC to each code block, and the transmitting UE may perform LDPC encoding for each code block to which the CRC is attached. Through this, each code block to which the CRC is attached may be converted into bit sequences including systematic bits and parity bits.

After encoding for each code block, the length of the code block may be rate matched to a specific size, based on limited buffer size and/or modulation order and/or the number of resource elements (REs) for data mapping in a PSSCH, etc. In the present disclosure, the rate-matched size after encoding for the r-th code block may be referred to as $E_r$ (bits). The location or the number of systematic bits, the location or the number of parity bits, etc., constituting a code block after encoding and rate matching (hereinafter, encoded code block) may be different based on a redundancy version (RV). For example, the RV may be indicated through sidelink control information (SCI). For example, the transmitting UE may transmit the SCI including the RV field to the receiving UE through the PSCCH.

For example, in the case of Uu link, assuming that the length of the bit sequences corresponding to the modulated symbol in the encoded code block is Q, the transmitting UE may perform interleaving so that an interval between adjacent bits in the encoded code block becomes Q.

Figure 13:
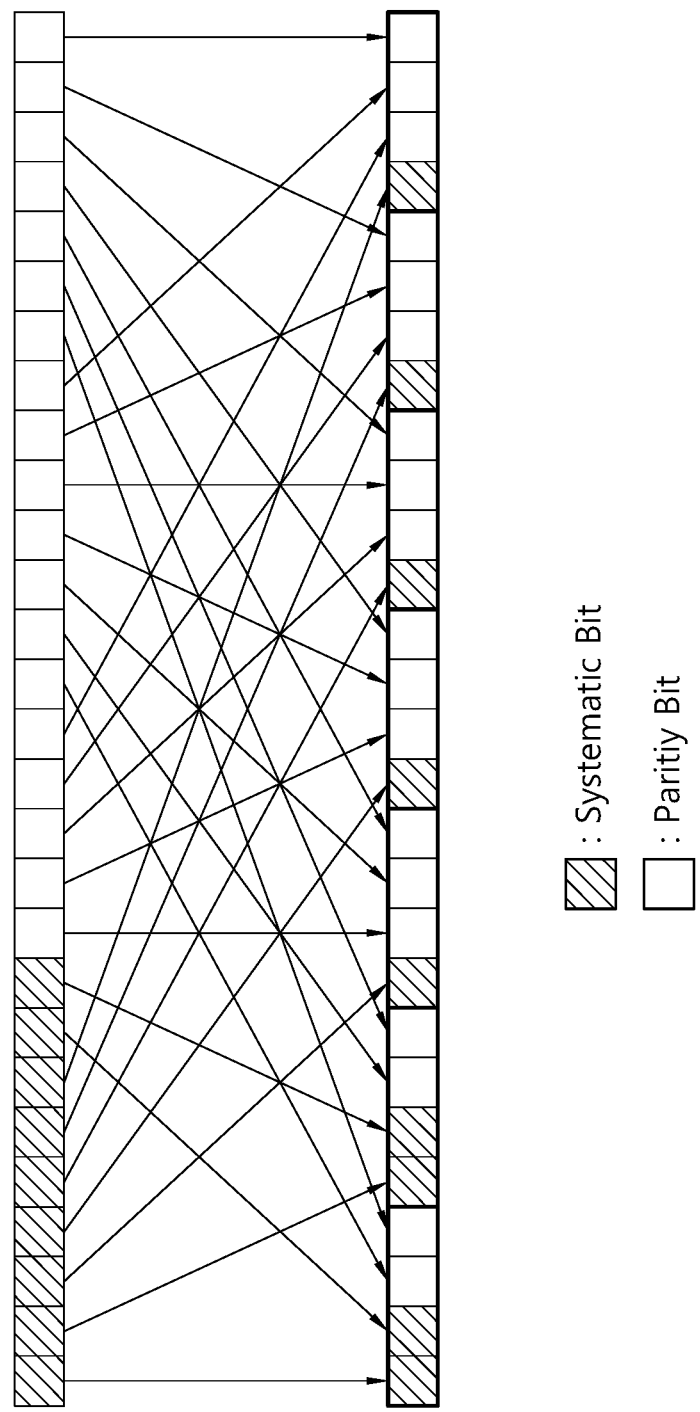
FIG. 13 shows an example of interleaving for an encoded code block.

FIG. 13 shows an example of interleaving for an encoded code block.

Referring to FIG. 13, for example, in the case of 16QAM, Q may be 4. Accordingly, the transmitting UE may perform interleaving so that an interval between adjacent bits in the encoded code block becomes 4. In the case of RV=0, through interleaving for the encoded code block, systematic bits of each code block may be placed at most in the most significant bit (MSB) of each modulated symbol. Accordingly, there is an advantage in that decoding performance is improved.

However, in the case of SL communication, if a UE utilizes the interleaver for the encoded code block in Uu link as it is, a situation in which systematic bits are always included in symbol(s) corresponding to the AGC period may occur. Accordingly, the receiving UE may have to perform decoding while not properly receiving a part of systematic bits, which may lead to deterioration of the decoding performance of the receiving UE.

Figure 14:
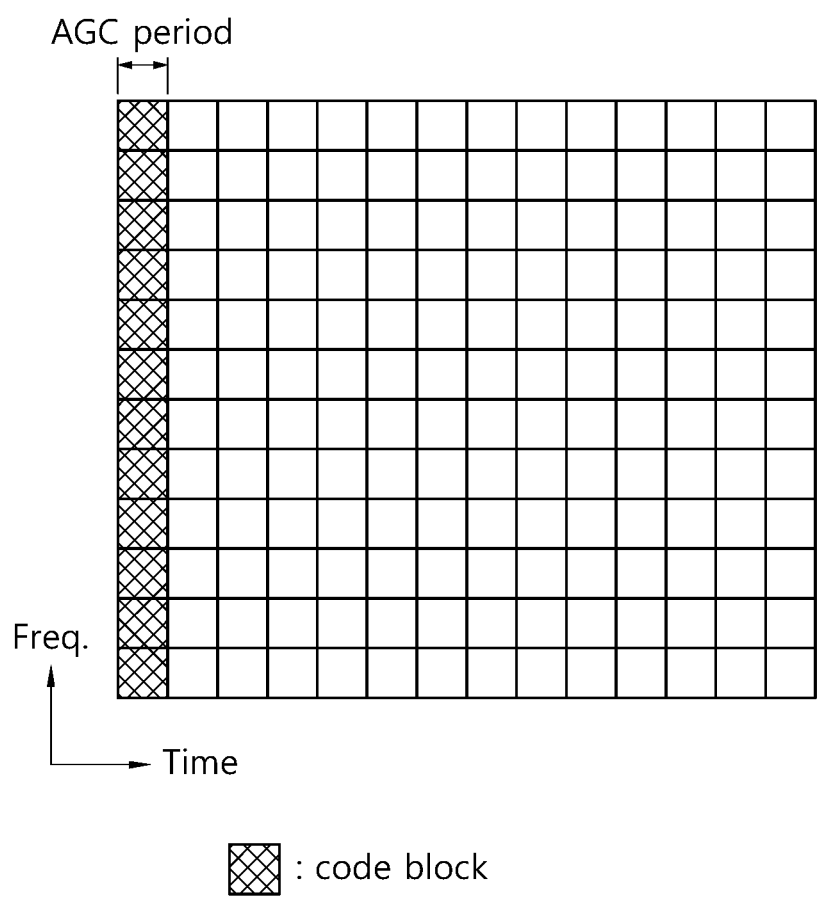
FIG. 14 shows an example of a code block mapped to an AGC period.

FIG. 14 shows an example of a code block mapped to an AGC period.

Meanwhile, as shown in FIG. 14, a specific code block may be transmitted only in a specific symbol based on the size of a TB. For example, a specific code block may be transmitted only in a specific (e.g., first) symbol (e.g., AGC symbol).

Figure 15:
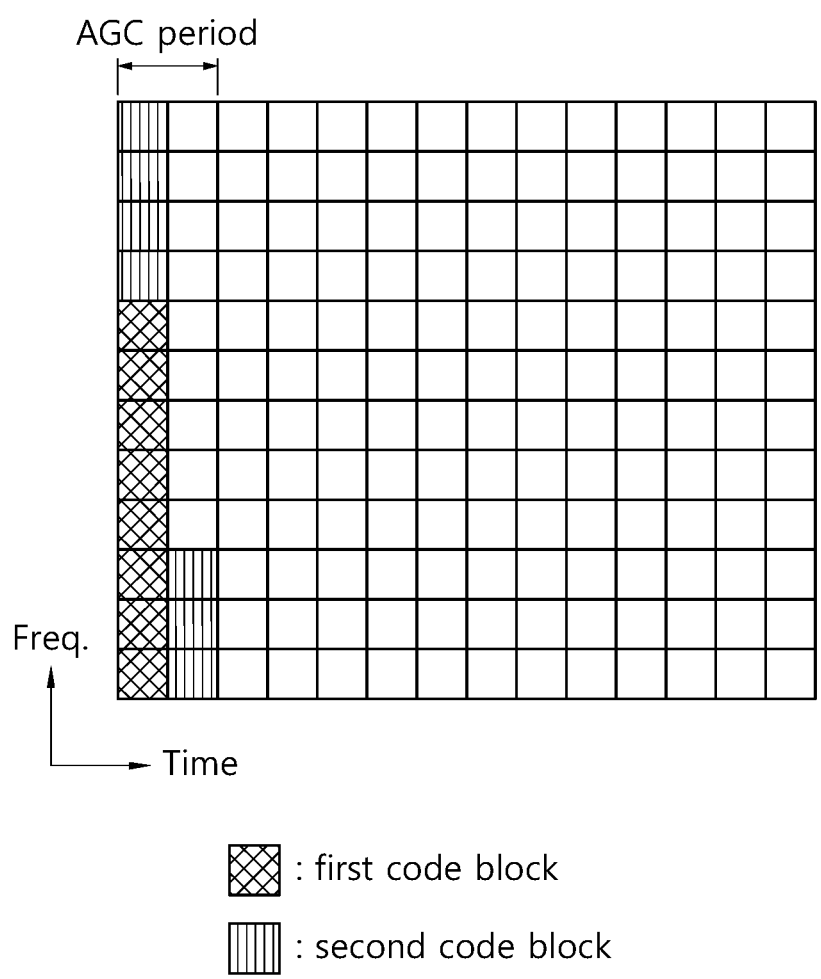
FIG. 15 shows an example of code blocks mapped to an AGC period.

FIG. 15 shows an example of code blocks mapped to an AGC period.

A plurality of code blocks may be mapped to at least one symbol in PSSCH resource(s) based on the size of a TB. Referring to FIG. 15, a first code block is mapped to the first symbol, and a second code block is mapped to the first symbol and the second symbol. It can be seen that both the first symbol and the second symbol of FIG. 15 are included in the AGC period.

In a situation like FIG. 14 or FIG. 15, a receiving UE may not receive a single code block or a plurality of code blocks at all in symbol(s) corresponding to the AGC period. Therefore, the receiving UE may fail to decode the TB, which may not be resolved even by retransmission of the TB based on a PSSCH.

Meanwhile, in order to increase the usage efficiency of resources for data, a form in which resource(s) related to a PSCCH is surrounded by resource(s) related to a PSSCH may be supported in the wireless RAT based on an embodiment.

Figure 16:
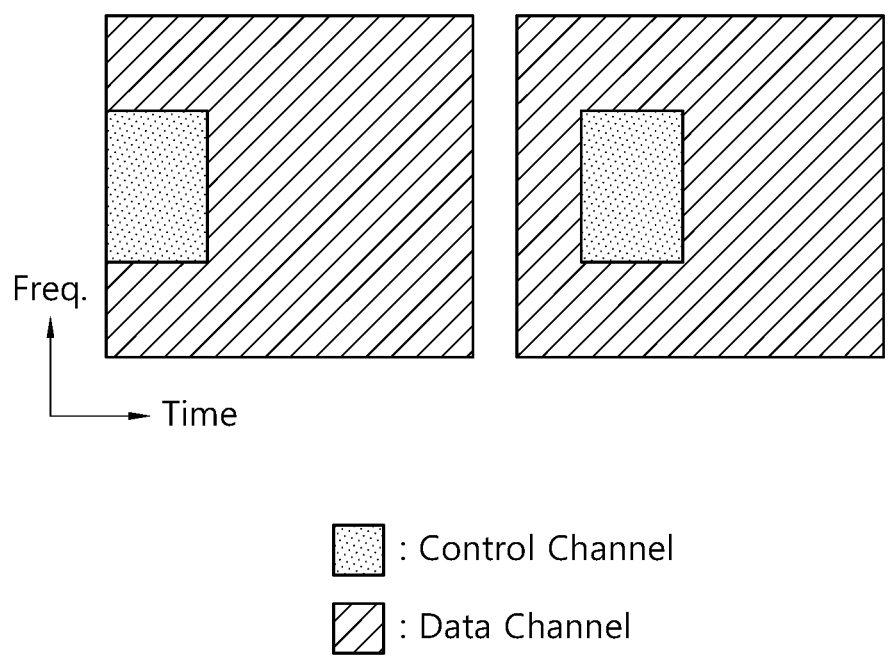
FIG. 16 shows an example of resource allocation for a data channel or a control channel.

FIG. 16 shows an example of resource allocation for a data channel or a control channel.

Referring to FIG. 16, resource(s) for a control channel (e.g., PSCCH) may be allocated in a form surrounded by resource(s) for a data channel (e.g., PSSCH). That is, the PSCCH and the PSSCH may be frequency division multiplexed (FDM) for a specific symbol group or one or more (adjacent) symbols, and only the PSSCH may be transmitted in other symbol groups or symbols different from one or more (adjacent) symbols. At the same time, for the purpose of maintaining total transmit power, power or power spectrum density (PSD) allocated for the PSSCH mapped to one or more (adjacent) symbols or a symbol group FDMed with the PSCCH may be smaller than power or PSD allocated for the PSCCH. Considering general code block placement and RE mapping, decoding performance for a specific code block(s) may be degraded, which may be a bottleneck for overall TB decoding performance.

Accordingly, based on an embodiment of the present disclosure, a method for efficiently interleaving code blocks, a method for efficiently disposing a plurality of code blocks, and an apparatus supporting the same are proposed.

In the present disclosure, it is assumed that a specific TB transmitted in a specific PSSCH includes C code blocks. In the present disclosure, it is assumed that the number of bits per a modulation symbol is $Q_m$. In the present disclosure, it is assumed that the number of layers for the specific TB is $N_L$. In addition, in the present disclosure, it is assumed that the size after rate matching for the r-th (encoded) code block is Er bits. It is assumed that the number of RBs allocated or scheduled for the PSSCH is N, and the number of subcarriers allocated or scheduled for the PSSCH is M.

Hereinafter, based on an embodiment of the present disclosure, a method in which a UE performs interleaving for some bits of an encoded code block will be described.

Figure 17:
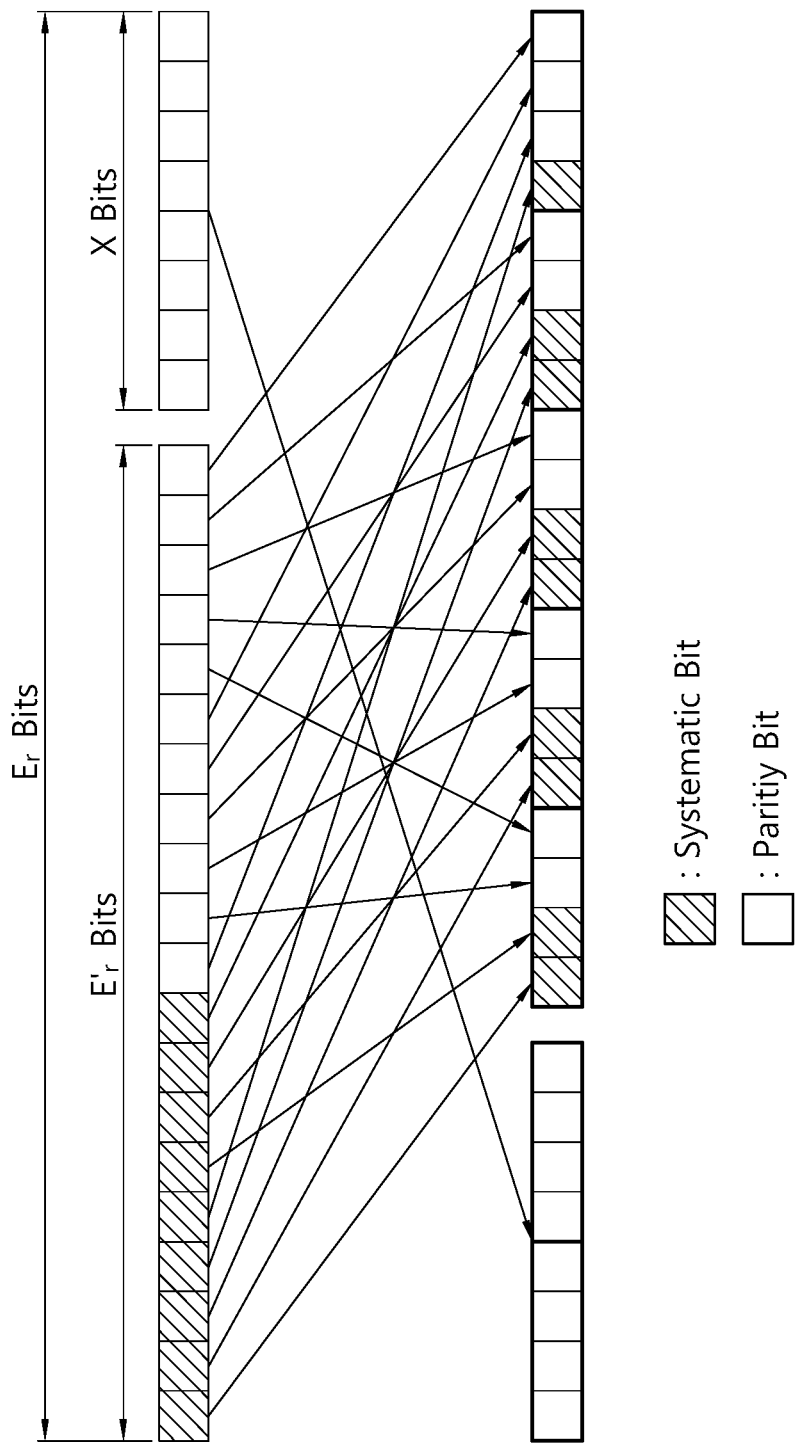
FIG. 17 shows an example in which a UE performs interleaving for some bits of an encoded code block.

FIG. 17 shows an example in which a UE performs interleaving for some bits of an encoded code block.

The UE may perform interleaving for some bits of each encoded code block. Accordingly, (in a specific environment), systematic bits may not be disposed as much as possible in symbol(s) corresponding to the AGC period or a symbol group FDMed with the PSCCH (or one or more (adjacent) symbols FDMed with the PSCCH). An example of the number of bits to be interleaved is as follows.

Referring to FIG. 17, with respect to a specific code block, the UE may perform interleaving for $E'_r$ bits. For example, $E'_r=E_r-X$. Er may be the size of bits after rate matching for the r-th (encoded) code block. For example, X may be a multiple of $Q_m$. For example, the X may be a value pre-defined (in the system). Alternatively, for example, the X may be a (pre-)configured value for the UE. Alternatively, for example, the X may be configured using PSSCH allocation, TBS, the number of code blocks and/or an index of the code block as parameters. For example, the UE may determine, calculate and/or obtain the X value based on PSSCH allocation, transport block size (TBS), the number of code blocks and/or the index of the code block.

Referring to FIG. 17, with respect to a specific code block, the UE may perform interleaving for $E'_r$ bits. For example, the UE may obtain $E'_r$ based on Equation 1 or Equation 2.

$$E'_r = N_L Q_m \left\lfloor \frac{G}{N_L Q_m (C+Y)} \right\rfloor \quad \text{[Equation 1]}$$

In Equation 1, $N_L$ may be the number of layers for a TB, and $Q_m$ may be the number of bits per a modulation symbol. C may be the number of code blocks included in the TB, and G may be the total number of coded bits available for transmission of the TB. Y may be a value pre-defined (in the system) or (pre-)configured for the UE. Alternatively, Y may be a value configured using PSSCH allocation, TBS, the number of code blocks, and/or an index of the code block as parameters. For example, the UE may determine, calculate, and/or obtain the Y value based on PSSCH allocation, TBS, the number of code blocks and/or the index of the code blocks. $y=\lfloor K \rfloor$ may be a floor function for obtaining the maximum integer less than or equal to K.

$$E'_r = N_L Q_m \left\lceil \frac{G}{N_L Q_m (C+Y)} \right\rceil \quad \text{[Equation 2]}$$

Herein, $N_L$ may be the number of layers for TB, and $Q_m$ may be the number of bits per a modulation symbol. C may be the number of code blocks included in the TB, and G may be the total number of coded bits available for transmission of the TB. Y may be a value pre-defined (in the system) or (pre-)configured for the UE. Alternatively, Y may be a value configured using PSSCH allocation, TBS, the number of code blocks, and/or an index of the code block as parameters. For example, the UE may determine, calculate, and/or obtain the Y value based on PSSCH allocation, TBS, the number of code blocks and/or the index of the code blocks. $y=\lceil K \rceil$ may be a ceiling function for obtaining the minimum integer greater than or equal to K.

Based on an embodiment of the present disclosure, if the UE determines $E'_r$ bits, the UE may select $E'_r$ bits to be interleaved from among Er bits for the encoded code block. The UE may select $E'_r$ bits to be interleaved from among Er bits based on the method proposed below.

The UE may select $E'_r$ bits from a MSB of the given code block. FIG. 17 shows an example in which a UE selects $E_r$ bits from a MSB of a given code block. If the UE selects $E'_r$ bits from the MSB, in the case of the RV is zero (RV=0), systematic bits may not be mapped to the ACG period in the future. However, if the RV value is not zero (RV≠0), systematic bits may be included in the ACG period. Therefore, according to the method for the UE to select $E'_r$ bits from the MSB, the UE may select whether a part to avoid the AGC period is a part for systematic bits or a part for parity bits, based on the RV value.

Alternatively, for a given code block, the UE may select $E'_r$ bits to be interleaved based on the RV value and/or the Er value. Specifically, the UE may select $E'_r$ bits from a bit index determined to be the start of systematic bits based on the RV value. Based on the bit index, the UE may select the bit by returning to the bit index 0 again to select $E'_r$ bits. According to a method in which the UE selects $E'_r$ bits to be interleaved based on the RV value and/or the Er value, the UE may prevent systematic bits from being mapped to the ACG period in the future regardless of the RV value.

Additionally, based on an embodiment of the present disclosure, in the case of $E_r$-[bits] not selected in the above process, the UE may not perform interleaving for the corresponding bit. Alternatively, in the case of $E_r$-$E'_r$ [bits] not selected in the above process, the UE may perform interleaving for the corresponding bit.

The interleaving method proposed above may be to replace E with $E'_r$ in the pseudo code in Table 5 below. Alternatively, in the interleaving method proposed above, $e_{i \cdot E/Q\_m+j}$ may be replaced with $e_{i \cdot E'r/Qm+j+offset(RV) \bmod E'r}$ in the pseudo codes in Table 5 below. For example, the interleaving method proposed above may be defined as shown in Table 6 below. Specifically, the offset (i.e., offset (RV) mod $E'_r$) using the RV as a parameter may indicate/represent the start bit index of systematic bits according to the RV value in the encoded code block. Accordingly, the UE may preferentially select systematic bits as the target of interleaving regardless of the RV value.

TABLE 5 for j = 0 to E / $Q_m$ − 1
  for i = 0 to $Q_m$ − 1
    $f_{i+j \cdot Q_m} = e_{i \cdot E / Q_m + j}$
  end for
end for

TABLE 6 for j = 0 to $E'_r$ / $Q_m$ − 1
  for i = 0 to $Q_m$ − 1
    $f_{i+j \cdot Q_m} = e_{i \cdot E'_r / Q_m + j + offset\ (RV) \bmod E'_r}$
  end for
end for Hereinafter, based on an embodiment of the present disclosure, a method for a UE to perform code block concatenation will be described. After performing interleaving for some bits of the code block, the UE may perform code block concatenation. Alternatively, the UE may independently perform code block concatenation regardless of interleaving for some bits of the code block (i.e., without performing interleaving for the code block).

The UE may generate a virtual encoded code block by collecting some bit(s) of each encoded code block. In addition, the virtual encoded code block may be disposed before other encoded code blocks. The virtual encoded code block which is disposed before other encoded code blocks may be highly likely to belong to the AGC period. In addition, the virtual encoded code block which is disposed before other encoded code blocks may be highly likely to be mapped to one or more (adjacent) symbols or a symbol group corresponding to a region in which the PSCCH and the PSSCH are FDMed.

Specifically, the UE may select $E_r$-$E'_r$ bits for each code block. For example, the bit(s) selected by the UE may be selected from a least significant bit (LSB) of each encoded code block. If the RV value is zero (RV=0), the bit(s) selected from the LSB may be parity bit(s). Alternatively, for example, the bit(s) selected by the UE may be differently selected based on the RV value and/or the Er value. For example, the bit(s) selected by the UE may be bit(s) that are not selected for interleaving.

Based on the proposed method, the puncturing effect due to the AGC period and/or the PSSCH power reduction effect according to the FDM of the PSCCH and the PSSCH may not be limited to a specific code block. That is, the puncturing effect due to the AGC period and/or the PSSCH power reduction effect according to the FDM of the PSCCH and the PSSCH may be uniformly applied to all or some code blocks. Accordingly, it is possible to prevent the TB decoding performance of the receiving UE from being reduced due to performance degradation of a specific code block.

Figure 18:
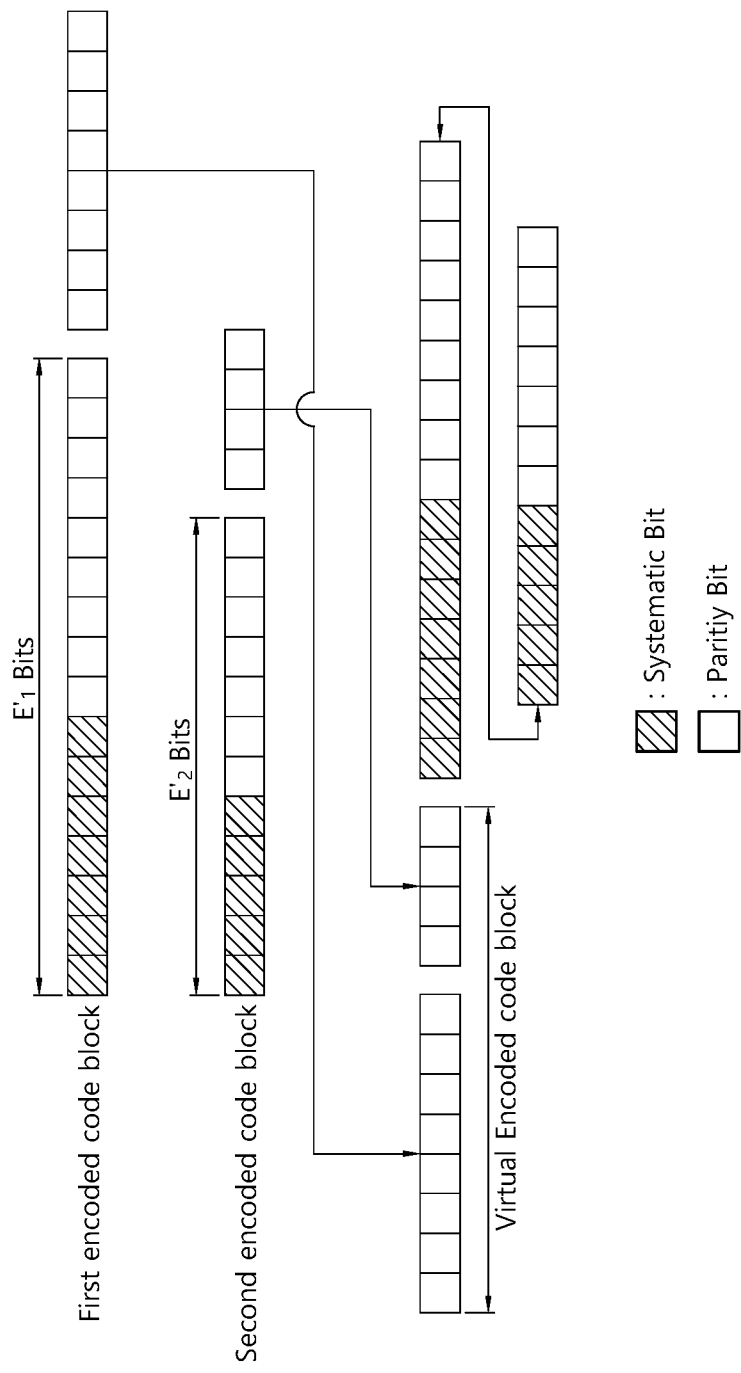
FIG. 18 shows an example in which a UE generates a virtual encoded code block.

FIG. 18 shows an example in which a UE generates a virtual encoded code block.

Referring to FIG. 18, the UE may select $E_1$-$E'_1$ bits from the LSB of the first code block, and may select $E_2$-$E'_2$ bits from the LSB of the second code block. In addition, the UE may generate a virtual encoded code block by collecting the selected bits. In addition, in code block concatenation, the UE may dispose the virtual encoded code block before other encoded code blocks. Based on the embodiment of FIG. 18, the UE may perform code block concatenation for code blocks on which interleaving is not performed.

Figure 19:
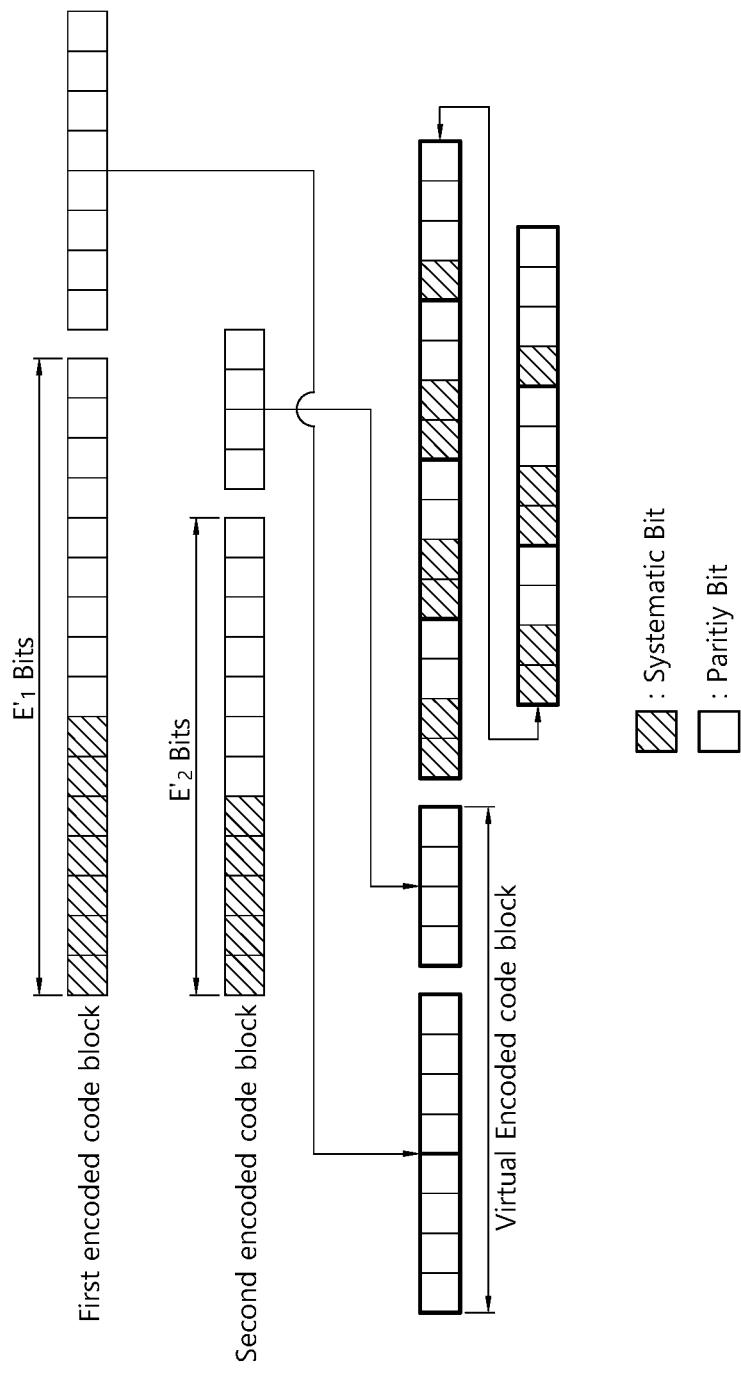
FIG. 19 shows another example in which a UE generates a virtual encoded code block.

FIG. 19 shows another example in which a UE generates a virtual encoded code block.

Referring to FIG. 19, the UE may select $E_1$-$E'_1$ bits from the LSB of the first code block, and may select $E_2$-$E'_2$ bits from the LSB of the second code block. Alternatively, the UE may select bit(s) that is not selected as an interleaving target for the first code block and bit(s) that is not selected as an interleaving target for the second code block. In addition, the UE may generate a virtual encoded code block by collecting the selected bit(s). In addition, in code block concatenation, the UE may dispose the virtual encoded code block before other encoded code blocks. Based on the embodiment of FIG. 19, after the UE performs interleaving for some bits of code blocks, the UE may perform code block concatenation.

Based on an embodiment of the present disclosure, as a result of the UE performing interleaving, the coded bit or demodulated symbol for the TB may be mapped in a form in which layer mapping, time axis mapping, and frequency axis mapping are sequentially performed. For example, the coded demodulation symbol may be mapped in an ascending order of layer index values from a layer having the lowest index value in a subcarrier having the lowest index value allocated to the first symbol. For example, after mapping to a layer having the (configured or indicated) maximum index value in the first symbol is completed, mapping may be performed in the next symbol of the first symbol from the layer having the lowest index value in an ascending order of layer index values. For example, after mapping from the lowest index subcarrier to the allocated maximum symbol is completed, the coded demodulation symbol may be mapped from the start symbol of a subcarrier having the next index value. For example, the mapping order of the coded bits or demodulated symbols may be applied when mapping for a PSSCH or a SL-SCH is performed. Meanwhile, for example, when the UE performs mapping for a PSCCH, a SCI, a second SCI and/or a CSI report, the mapping order of coded bits or demodulated symbols may be different from a case in which mapping for the PSSCH or the SL-SCH is performed. For example, when the UE performs mapping for at least one of a PSCCH, a SCI, a second SCI and/or a CSI reporting, mapping of coded bits or demodulated symbols may be performed in the order of layer mapping, frequency axis mapping, and time axis mapping. In this case, when the UE performs mapping for specific signaling(s), an advantage can be obtained in terms of delay time or complexity by not performing the interleaving process. Alternatively, for example, when the UE performs mapping for a PSCCH, a SCI, a second SCI and/or a CSI report, mapping of coded bits or demodulated symbols may be performed in the order of layer mapping, time axis mapping, and frequency axis mapping in the same manner as in the case of performing mapping for the PSSCH or the SL-SCH. In this case, regardless of the type of information transmitted by the UE through PSSCH resource(s), an advantage in that complexity is relatively low can be obtained by adopting the same method of performing interleaving, Hereinafter, based on an embodiment of the present disclosure, a method for a UE to perform VRB-to-PRB mapping will be described. After performing interleaving and/or code block concatenation, the UE may perform VRB-to-PRB mapping. Alternatively, the UE may independently perform VRB-to-PRB mapping regardless of whether the UE performs interleaving and code block concatenation (i.e., the UE does not perform interleaving and code block concatenation for the code block). In this case, a physical resource block (PRB) means the unit of the frequency-time resource, and one PRB includes a plurality of continuous REs in the frequency-time domain, and a plurality of PRBs may be defined in one slot or in one subframe. In this case, a virtual resource block (VRB) means a virtual unit of the resource for transmission of the SL data channel or the SL control channel, and the number of resource elements (REs) included in one VRB is equal to the number of REs included in one PRB. For transmission of the SL data channel or the SL control channel, one VRB may be mapped to a PRB, or one VRB may be mapped to multiple PRBs.

With respect to the number N of RBs allocated or scheduled for the PSSCH, the UE may first map a coded modulation symbol to the VRB. For example, the mapping may be performed in an increasing order frequency first method. In addition, when the UE performs interleaving, the UE may write the allocated or scheduled VRB index in the interleaver matrix in a row-by-row manner, and may read in a column-by-column manner. In addition, the UE may perform PRB mapping according to a result of performing interleaving.

Figure 20:
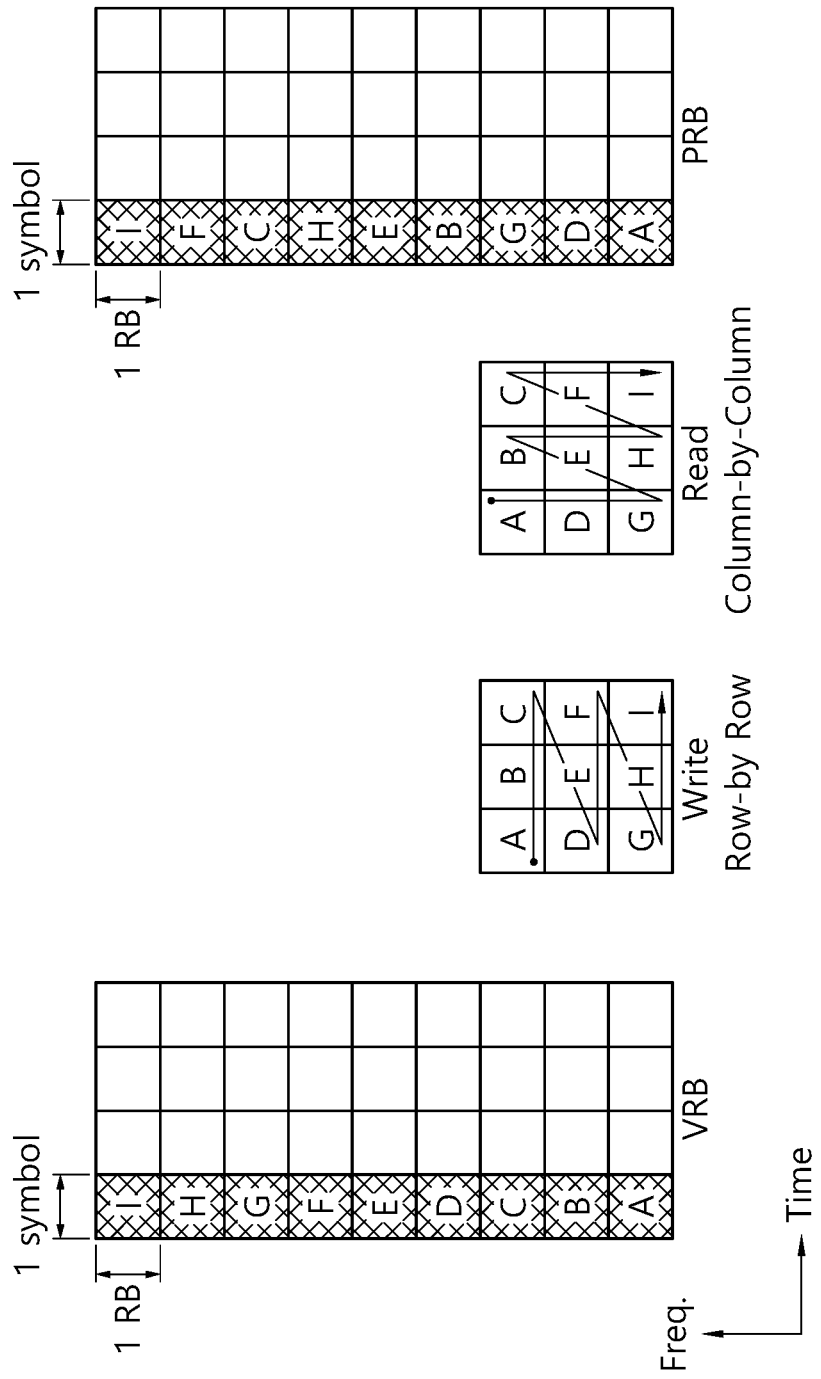
FIG. 20 shows an example of VRB-to-PRB mapping.

FIG. 20 shows an example of VRB-to-PRB mapping.

Referring to FIG. 20, for 9 RBs allocated or scheduled for the PSSCH, the UE may first map coded modulation symbols to VRB. In addition, when the UE performs the interleaver, the UE may write the allocated or scheduled VRB index in the 3×3 interleaver matrix in a row-by-row manner, and may read it in a column-by-column manner. In addition, the UE may perform PRB mapping according to a result of performing interleaving.

Figure 21:
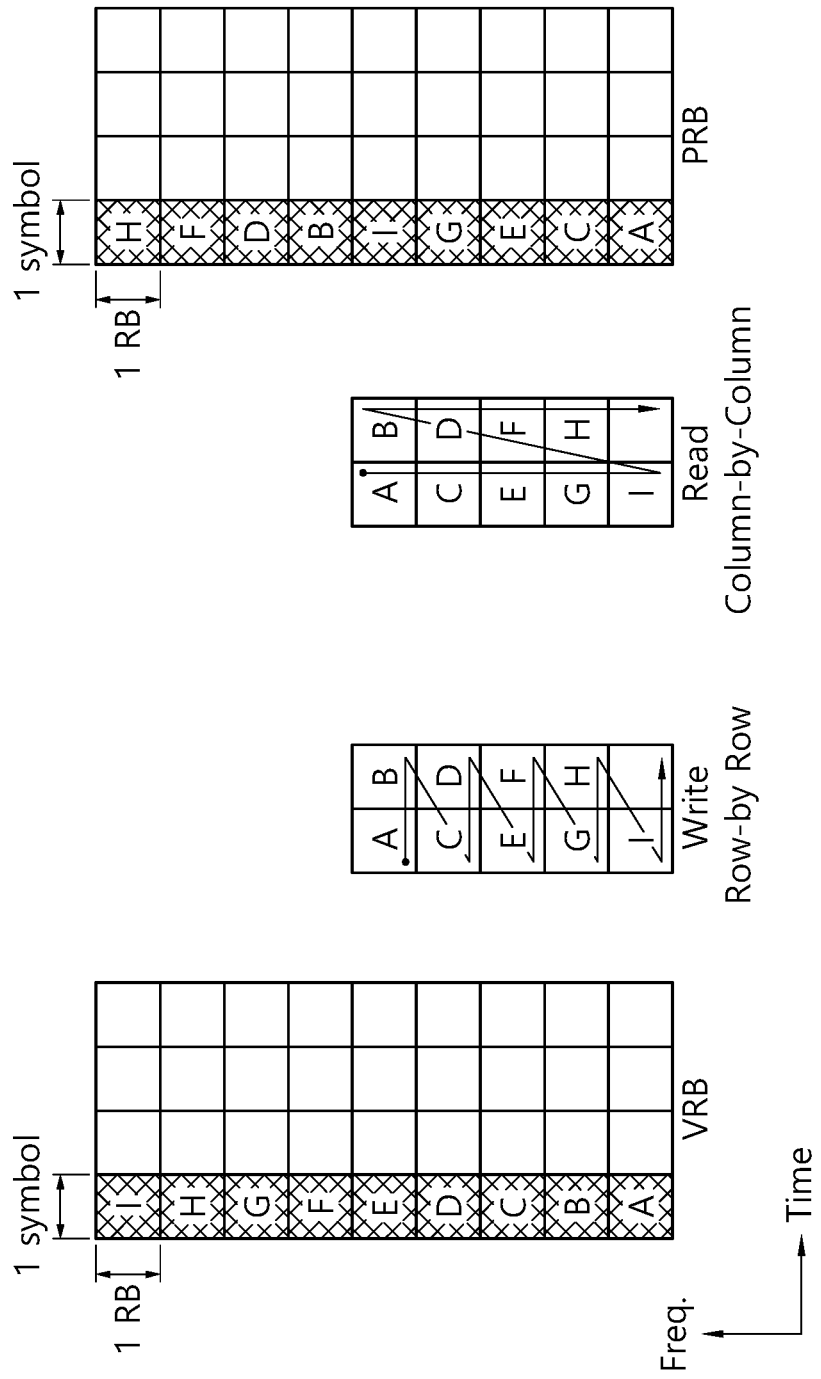
FIG. 21 shows another example of VRB-to-PRB mapping.

FIG. 21 shows another example of VRB-to-PRB mapping.

Referring to FIG. 21, for 9 RBs allocated or scheduled for the PSSCH, the UE may first map coded modulation symbols to VRB. In addition, when the UE performs the interleaver, the UE may write the allocated or scheduled VRB index in the 3×2 interleaver matrix in a row-by-row manner, and may read it in a column-by-column manner. In addition, the UE may perform PRB mapping according to a result of performing interleaving.

In the proposed method, for example, the number of rows of the interleaver matrix may be pre-defined (in the system). For example, the number of rows of the interleaver matrix may be defined as two. Alternatively, for example, the number of rows of the interleaver matrix may be (pre-) configured for the UE. For example, the UE may select/determine the smallest value among values for which the product of the number of rows and the number of columns is greater than N as the number of columns of the interleaver matrix. Alternatively, the number of columns of the interleaver matrix may be pre-defined or (pre-)configured for the UE, and the number of rows may be derived from the number of columns. Alternatively, the number of columns and the number of rows of the interleaver matrix may be pre-defined or (pre-)configured for the UE.

For example, an element of the interleaver matrix may be an RB, an RB bundle, or a sub-channel. According to the unit of the element, a reference for deriving the number of columns or the number of rows of the interleaver matrix may be changed to the number of RB bundles or the number of subchannels instead of the number of RBs N.

Based on the proposed method, the UE can distribute and transmit a specific code block to several RBs while still maintaining continuous allocation for PRB allocation. Accordingly, a frequency diversity gain can be obtained.

Based on the embodiments described above in FIGS. 12 to 21 of the present disclosure, when the UE and/or the base station perform rate matching and arrangement for the code block, it is possible to minimize performance degradation due to the AGC period and/or performance degradation due to power reduction for the PSSCH.

Figure 22:
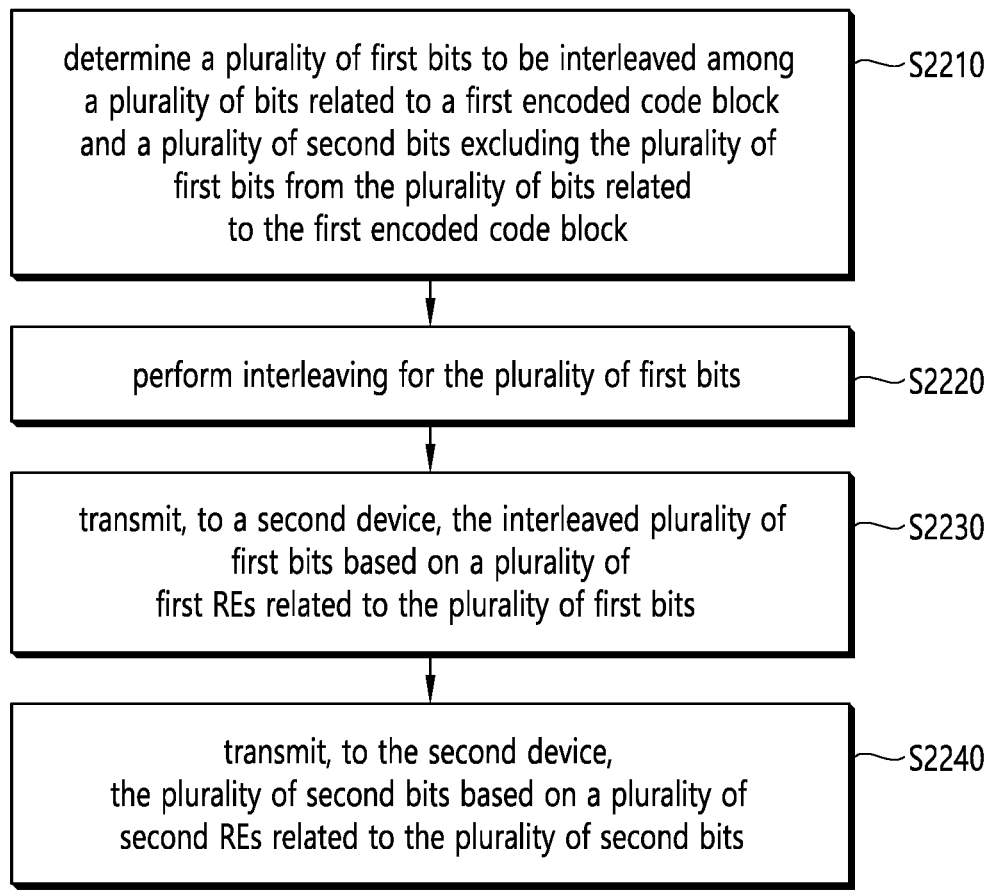
FIG. 22 shows operations of a first device, based on an embodiment of the present disclosure.

FIG. 22 shows operations of a first device, based on an embodiment of the present disclosure.

The operations disclosed in the flowchart of FIG. 22 may be performed in combination with various embodiments of the present disclosure. For example, the operations disclosed in the flowchart of FIG. 22 may be performed based on at least one of devices illustrated in FIGS. 24 to 29. For example, the first device of FIG. 22 may be the first wireless device 100 of FIG. 25 to be described later. In another example, the first device of FIG. 22 may be the second wireless device 200 of FIG. 25 to be described later.

In step S2210, the first device may determine a plurality of first bits to be interleaved among a plurality of bits related to a first encoded code block and a plurality of second bits excluding the plurality of first bits from the plurality of bits related to the first encoded code block. For example, the first encoded code block may be the first encoded code block of FIG. 19, and the first bits may be $E'_1$ bits of FIG. 19, and the second bits may be obtained by excluding $E'_1$ bits from the total number of bits of the first encoded code block in FIG. 19.

In step S2220, the first device may perform interleaving for the plurality of first bits. For example, as shown in FIG. 19, the first device may perform interleaving for $E'_1$ bits.

In step S2230, the first device may transmit, to a second device, the interleaved plurality of first bits based on a plurality of first resource elements (REs) related to the plurality of first bits.

In step S2240, the first device may transmit, to the second device, the plurality of second bits based on a plurality of second REs related to the plurality of second bits.

For example, a first symbol period that is a symbol period of the plurality of first REs may be located after a second symbol period that is a symbol period of the plurality of second REs, or the first symbol in the first symbol period may be the same as the last symbol in the second symbol period. Based on the first symbol in the first symbol period being the same as the last symbol in the second symbol period, the plurality of second REs may be located in a lower frequency region than the plurality of first REs.

For example, the first symbol period and the second symbol period may be the same as the first symbol in the N-th slot. For example, the first symbol period and the second symbol period may be the same as the second symbol in the N-th slot. For example, the first symbol period and the second symbol period may be the same as the third symbol in the N-th slot. Herein, N may be a positive integer.

For example, the second symbol period may be the first symbol in the N-th slot, and the first symbol period may be the second symbol in the N-th slot. For example, the second symbol period may be the first symbol in the N-th slot, and the first symbol period may be the third symbol in the N-th slot. For example, the second symbol period may be the first symbol in the N-th slot, and the first symbol period may be the fourth symbol in the N-th slot. For example, the second symbol period may be the second symbol in the N-th slot, and the first symbol period may be the third symbol in the N-th slot. Herein, N may be a positive integer.

For example, the second symbol period may be the first symbol and the second symbol in the N-th slot, and the first symbol period may be the second symbol and the third symbol in the N-th slot. Herein, N may be a positive integer. Based on the first symbol in the first symbol period (the second symbol in the N-th slot) being the same as the last symbol in the second symbol period (the second symbol in the N-th slot), the plurality of second REs may be located in a lower frequency region than the plurality of first REs. Herein, N may be a positive integer.

For example, the plurality of second bits may be a plurality of consecutive bits from a least significant bit (LSB) of the encoded code block.

For example, the plurality of second bits may be a plurality of parity bits.

For example, the plurality of second bits may be the plurality of parity bits, based on a redundancy version (RV) which is zero.

For example, the first device may determine a plurality of third bits to be interleaved among a plurality of bits related to a second encoded code block and a plurality of fourth bits excluding the plurality of third bits from the plurality of bits related to the second encoded code block, and the first device may perform interleaving for the plurality of third bits, and the first device may transmit, to the second device, the interleaved plurality of third bits based on a plurality of third REs related to the plurality of third bits, and the first device may transmit, to the second device, the plurality of fourth bits based on a plurality of fourth REs related to the plurality of fourth bits.

For example, the second encoded code block may be the second encoded code block of FIG. 19, and the third bits may be $E'_2$ bits of FIG. 19, and the fourth bits may be obtained by excluding $E'_2$ bits from the total number of bits of the second encoded code block in FIG. 19. As shown in FIG. 19, the first device may perform interleaving for $E'_2$ bits.

For example, a third symbol period that is a symbol period of the plurality of third REs may be located after a fourth symbol period that is a symbol period of the plurality of fourth REs, or the first symbol in the third symbol period may be the same as the last symbol in the fourth symbol period. Based on the first symbol in the third symbol period being the same as the last symbol in the fourth symbol period, the plurality of fourth REs may be located in a lower frequency region than the plurality of third REs.

For example, the third symbol period and the fourth symbol period may be the same as the first symbol in the N-th slot. For example, the third symbol period and the fourth symbol period may be the same as the second symbol in the N-th slot. For example, the third symbol period and the fourth symbol period may be the same as the third symbol in the N-th slot. Herein, N may be a positive integer.

For example, the fourth symbol period may be the first symbol in the N-th slot, and the third symbol period may be the second symbol in the N-th slot. For example, the fourth symbol period may be the first symbol in the N-th slot, and the third symbol period may be the third symbol in the N-th slot. For example, the fourth symbol period may be the first symbol in the N-th slot, and the third symbol period may be the fourth symbol in the N-th slot. For example, the fourth symbol period may be the second symbol in the N-th slot, and the third symbol period may be the third symbol in the N-th slot. Herein, N may be a positive integer.

For example, the fourth symbol period may be the first symbol and the second symbol in the N-th slot, and the third symbol period may be the second symbol and the third symbol in the N-th slot. Herein, N may be a positive integer. Based on the first symbol in the third symbol period (the second symbol in the N-th slot) being the same as the last symbol in the fourth symbol period (the second symbol in the N-th slot), the plurality of fourth REs may be located in a lower frequency region than the plurality of third REs. Herein, N may be a positive integer.

For example, a fifth symbol period including the first symbol period and the third symbol period may be located after a sixth symbol period including the second symbol period and the fourth symbol period, or the first symbol in the fifth symbol period may be the same as a last symbol in the sixth symbol period. Based on the first symbol in the fifth symbol period being the same as the last symbol in the sixth symbol period, at least one RE among the plurality of second REs and the plurality of fourth REs may be located in a lower frequency region than at least one RE among the plurality of first REs and the plurality of third REs.

For example, a virtual encoded code block may be generated based on the plurality of second REs and the plurality of fourth REs.

For example, the sixth symbol period may be included in a symbol period related to automatic gain control (AGC). For example, the symbol period of the virtual encoded code block may be included in a symbol period related to the AGC. For example, the sixth symbol period and the symbol period related to the AGC may be the same as the first symbol of the N-th slot.

For example, the sixth symbol period may be included in a symbol period in which a physical sidelink control channel (PSCCH) is transmitted. For example, the symbol period of the virtual encoded code block may be included in a symbol period in which the PSCCH is transmitted. For example, the sixth symbol period may be the first symbol of the N-th slot, and the symbol period in which the PSCCH is transmitted may be the first to third symbols or the second to fourth symbols of the N-th slot.

For example, the number of the plurality of first bits may be determined based on at least one of a number of layers for a transport block related to the first encoded code block, a number of bits per a modulation symbol, a number of code blocks included in the transport block, or a total number of coded bits available for the transport block.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: determine a plurality of first bits to be interleaved among a plurality of bits related to a first encoded code block and a plurality of second bits excluding the plurality of first bits from the plurality of bits related to the first encoded code block; perform interleaving for the plurality of first bits; transmit, to a second device, the interleaved plurality of first bits based on a plurality of first resource elements (REs) related to the plurality of first bits; and transmit, to the second device, the plurality of second bits based on a plurality of second REs related to the plurality of second bits.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: determine a plurality of first bits to be interleaved among a plurality of bits related to a first encoded code block and a plurality of second bits excluding the plurality of first bits from the plurality of bits related to the first encoded code block; perform interleaving for the plurality of first bits; transmit, to a second UE, the interleaved plurality of first bits based on a plurality of first resource elements (REs) related to the plurality of first bits; and transmit, to the second UE, the plurality of second bits based on a plurality of second REs related to the plurality of second bits.

For example, the first UE of the embodiment may refer to the first device described in the present disclosure. For example, each of the at least one processor and the at least one memory in the apparatus configured to control the first UE may be implemented as a separate sub-chip, or at least two or more components may be implemented through one sub-chip.

Based on an embodiment of the present disclosure, a non-transitory computer-readable storage medium storing instructions may be provided. The instructions, when executed, may cause a first device to: determine a plurality of first bits to be interleaved among a plurality of bits related to a first encoded code block and a plurality of second bits excluding the plurality of first bits from the plurality of bits related to the first encoded code block; perform interleaving for the plurality of first bits; transmit, to a second device, the interleaved plurality of first bits based on a plurality of first resource elements (REs) related to the plurality of first bits; and transmit, to the second device, the plurality of second bits based on a plurality of second REs related to the plurality of second bits.

Figure 23:
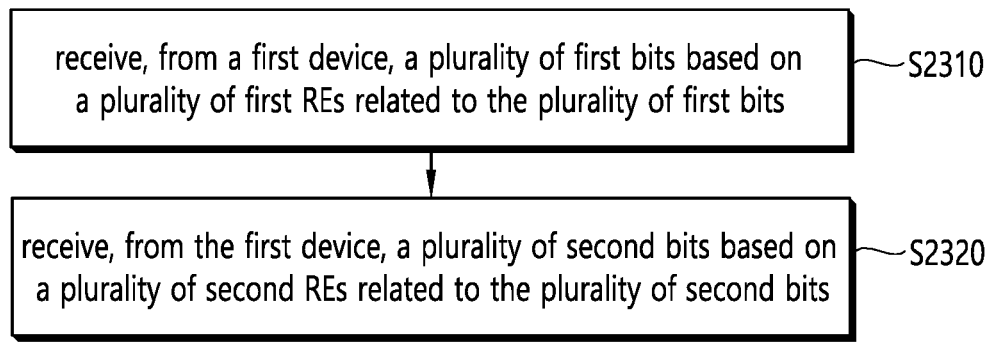
FIG. 23 shows operations of a second device, based on an embodiment of the present disclosure.

FIG. 23 shows operations of a second device, based on an embodiment of the present disclosure.

The operations disclosed in the flowchart of FIG. 23 may be performed in combination with various embodiments of the present disclosure. For example, the operations disclosed in the flowchart of FIG. 23 may be performed based on at least one of devices illustrated in FIGS. 24 to 29. For example, the second device of FIG. 23 may be the second wireless device 200 of FIG. 25 to be described later. In another example, the second device of FIG. 23 may be the first wireless device 100 of FIG. 25 to be described later.

In step S2310, the second device may receive, from a first device, a plurality of first bits based on a plurality of first resource elements (REs) related to the plurality of first bits.

In step S2320, the second device may receive, from the first device, a plurality of second bits based on a plurality of second REs related to the plurality of second bits.

For example, the plurality of first bits may be a plurality of bits interleaved by the first device among a plurality of bits related to a code block encoded by the first device.

For example, the plurality of second bits may be a plurality of bits excluding the plurality of first bits from the plurality of bits related to the code block encoded by the first device.

For example, a first symbol period that is a symbol period of the plurality of first REs may be located after a second symbol period that is a symbol period of the plurality of second REs, or the first symbol in the first symbol period may be the same as the last symbol in the second symbol period. Based on the first symbol in the first symbol period being the same as the last symbol in the second symbol period, the plurality of second REs may be located in a lower frequency region than the plurality of first REs.

For example, the first symbol period and the second symbol period may be the same as the first symbol in the N-th slot. For example, the first symbol period and the second symbol period may be the same as the second symbol in the N-th slot. For example, the first symbol period and the second symbol period may be the same as the third symbol in the N-th slot. Herein, N may be a positive integer.

For example, the second symbol period may be the first symbol in the N-th slot, and the first symbol period may be the second symbol in the N-th slot. For example, the second symbol period may be the first symbol in the N-th slot, and the first symbol period may be the third symbol in the N-th slot. For example, the second symbol period may be the first symbol in the N-th slot, and the first symbol period may be the fourth symbol in the N-th slot. For example, the second symbol period may be the second symbol in the N-th slot, and the first symbol period may be the third symbol in the N-th slot. Herein, N may be a positive integer.

For example, the second symbol period may be the first symbol and the second symbol in the N-th slot, and the first symbol period may be the second symbol and the third symbol in the N-th slot. Herein, N may be a positive integer. Based on the first symbol in the first symbol period (the second symbol in the N-th slot) being the same as the last symbol in the second symbol period (the second symbol in the N-th slot), the plurality of second REs may be located in a lower frequency region than the plurality of first REs. Herein, N may be a positive integer.

For example, the plurality of second bits may be a plurality of consecutive bits from a least significant bit (LSB) of the encoded code block.

For example, the plurality of second bits may be a plurality of parity bits.

For example, the plurality of second bits may be the plurality of parity bits, based on a redundancy version (RV) which is zero.

For example, the first device may determine a plurality of third bits to be interleaved among a plurality of bits related to a second encoded code block and a plurality of fourth bits excluding the plurality of third bits from the plurality of bits related to the second encoded code block, and the first device may perform interleaving for the plurality of third bits, and the first device may transmit, to the second device, the interleaved plurality of third bits based on a plurality of third REs related to the plurality of third bits, and the first device may transmit, to the second device, the plurality of fourth bits based on a plurality of fourth REs related to the plurality of fourth bits.

For example, the second encoded code block may be the second encoded code block of FIG. 19, and the third bits may be $E'_2$ bits of FIG. 19, and the fourth bits may be obtained by excluding $E'_2$ bits from the total number of bits of the second encoded code block in FIG. 19. As shown in FIG. 19, the first device may perform interleaving for $E'_2$ bits.

For example, a third symbol period that is a symbol period of the plurality of third REs may be located after a fourth symbol period that is a symbol period of the plurality of fourth REs, or the first symbol in the third symbol period may be the same as the last symbol in the fourth symbol period. Based on the first symbol in the third symbol period being the same as the last symbol in the fourth symbol period, the plurality of fourth REs may be located in a lower frequency region than the plurality of third REs.

For example, the third symbol period and the fourth symbol period may be the same as the first symbol in the N-th slot. For example, the third symbol period and the fourth symbol period may be the same as the second symbol in the N-th slot. For example, the third symbol period and the fourth symbol period may be the same as the third symbol in the N-th slot. Herein, N may be a positive integer.

For example, the fourth symbol period may be the first symbol in the N-th slot, and the third symbol period may be the second symbol in the N-th slot. For example, the fourth symbol period may be the first symbol in the N-th slot, and the third symbol period may be the third symbol in the N-th slot. For example, the fourth symbol period may be the first symbol in the N-th slot, and the third symbol period may be the fourth symbol in the N-th slot. For example, the fourth symbol period may be the second symbol in the N-th slot, and the third symbol period may be the third symbol in the N-th slot. Herein, N may be a positive integer.

For example, the fourth symbol period may be the first symbol and the second symbol in the N-th slot, and the third symbol period may be the second symbol and the third symbol in the N-th slot. Herein, N may be a positive integer. Based on the first symbol in the third symbol period (the second symbol in the N-th slot) being the same as the last symbol in the fourth symbol period (the second symbol in the N-th slot), the plurality of fourth REs may be located in a lower frequency region than the plurality of third REs. Herein, N may be a positive integer.

For example, a fifth symbol period including the first symbol period and the third symbol period may be located after a sixth symbol period including the second symbol period and the fourth symbol period, or the first symbol in the fifth symbol period may be the same as a last symbol in the sixth symbol period. Based on the first symbol in the fifth symbol period being the same as the last symbol in the sixth symbol period, at least one RE among the plurality of second REs and the plurality of fourth REs may be located in a lower frequency region than at least one RE among the plurality of first REs and the plurality of third REs.

For example, a virtual encoded code block may be generated based on the plurality of second REs and the plurality of fourth REs.

For example, the sixth symbol period may be included in a symbol period related to automatic gain control (AGC). For example, the symbol period of the virtual encoded code block may be included in a symbol period related to the AGC. For example, the sixth symbol period and the symbol period related to the AGC may be the same as the first symbol of the N-th slot.

For example, the sixth symbol period may be included in a symbol period in which a physical sidelink control channel (PSCCH) is transmitted. For example, the symbol period of the virtual encoded code block may be included in a symbol period in which the PSCCH is transmitted. For example, the sixth symbol period may be the first symbol of the N-th slot, and the symbol period in which the PSCCH is transmitted may be the first to third symbols or the second to fourth symbols of the N-th slot.

For example, the number of the plurality of first bits may be determined based on at least one of a number of layers for a transport block related to the first encoded code block, a number of bits per a modulation symbol, a number of code blocks included in the transport block, or a total number of coded bits available for the transport block.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: receive, from a first device, a plurality of first bits based on a plurality of first resource elements (REs) related to the plurality of first bits; and receive, from the first device, a plurality of second bits based on a plurality of second REs related to the plurality of second bits, wherein the plurality of first bits are a plurality of bits interleaved by the first device among a plurality of bits related to a code block encoded by the first device, and wherein the plurality of second bits are a plurality of bits excluding the plurality of first bits from the plurality of bits related to the code block encoded by the first device.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
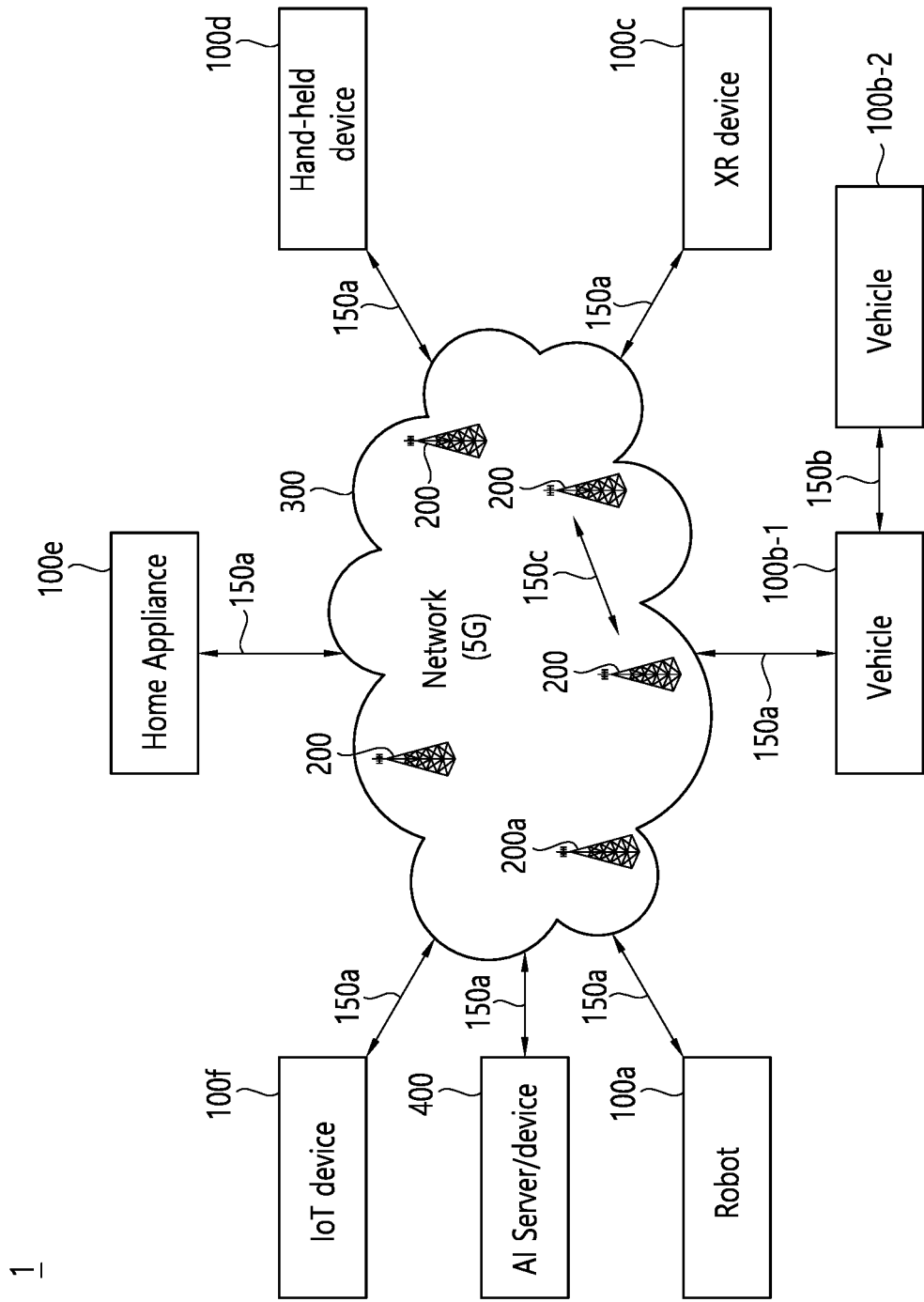
FIG. 24 shows a communication system 1, based on an embodiment of the present disclosure.

FIG. 24 shows a communication system 1, based on an embodiment of the present disclosure.

Referring to FIG. 24, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
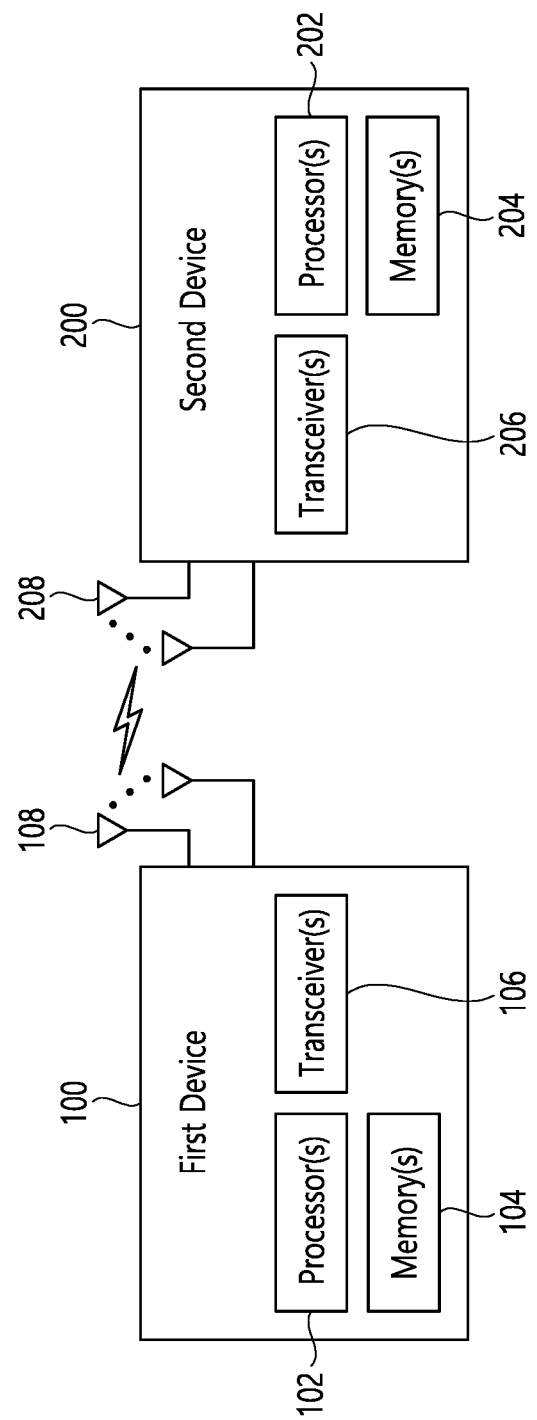
FIG. 25 shows wireless devices, based on an embodiment of the present disclosure.

FIG. 25 shows wireless devices, based on an embodiment of the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 26:
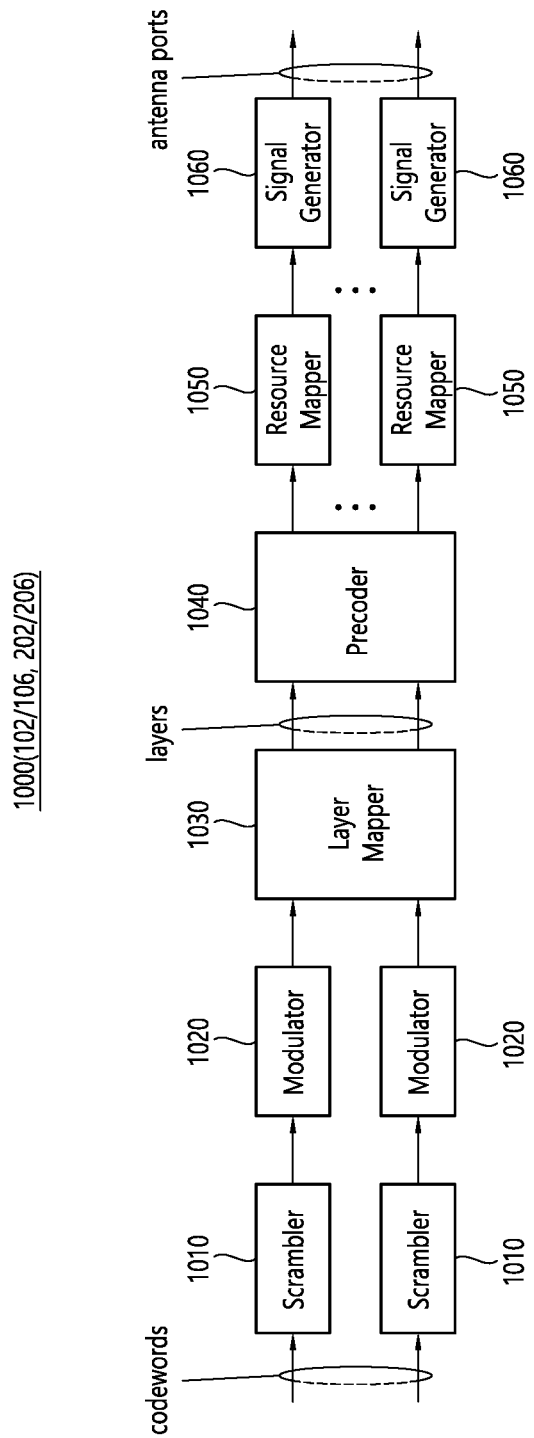
FIG. 26 shows a signal process circuit for a transmission signal, based on an embodiment of the present disclosure.

FIG. 26 shows a signal process circuit for a transmission signal, based on an embodiment of the present disclosure.

Referring to FIG. 26, a signal processing circuit 1000 may include scramblers 1010, modulators 1020, a layer mapper 1030, a precoder 1040, resource mappers 1050, and signal generators 1060. An operation/function of FIG. 26 may be performed, without being limited to, the processors 102 and 202 and/or the transceivers 106 and 206 of FIG. 25. Hardware elements of FIG. 26 may be implemented by the processors 102 and 202 and/or the transceivers 106 and 206 of FIG. 25. For example, blocks 1010 to 1060 may be implemented by the processors 102 and 202 of FIG. 25. Alternatively, the blocks 1010 to 1050 may be implemented by the processors 102 and 202 of FIG. 25 and the block 1060 may be implemented by the transceivers 106 and 206 of FIG. 25.

Codewords may be converted into radio signals via the signal processing circuit 1000 of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
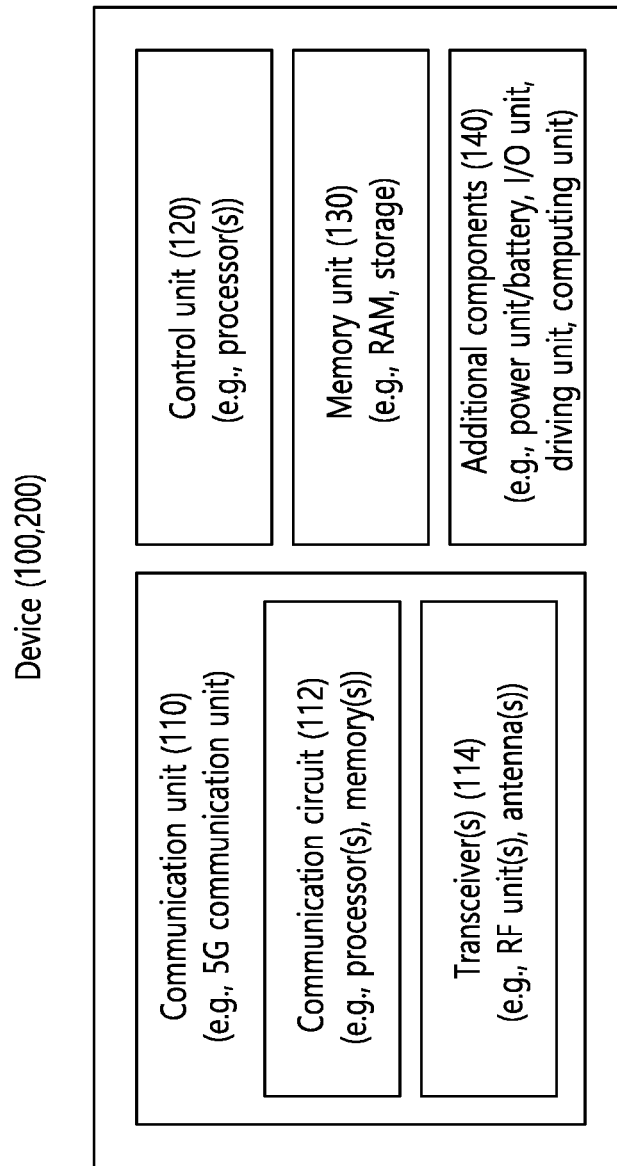
FIG. 27 shows another example of a wireless device, based on an embodiment of the present disclosure.

FIG. 27 shows another example of a wireless device, based on an embodiment of the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
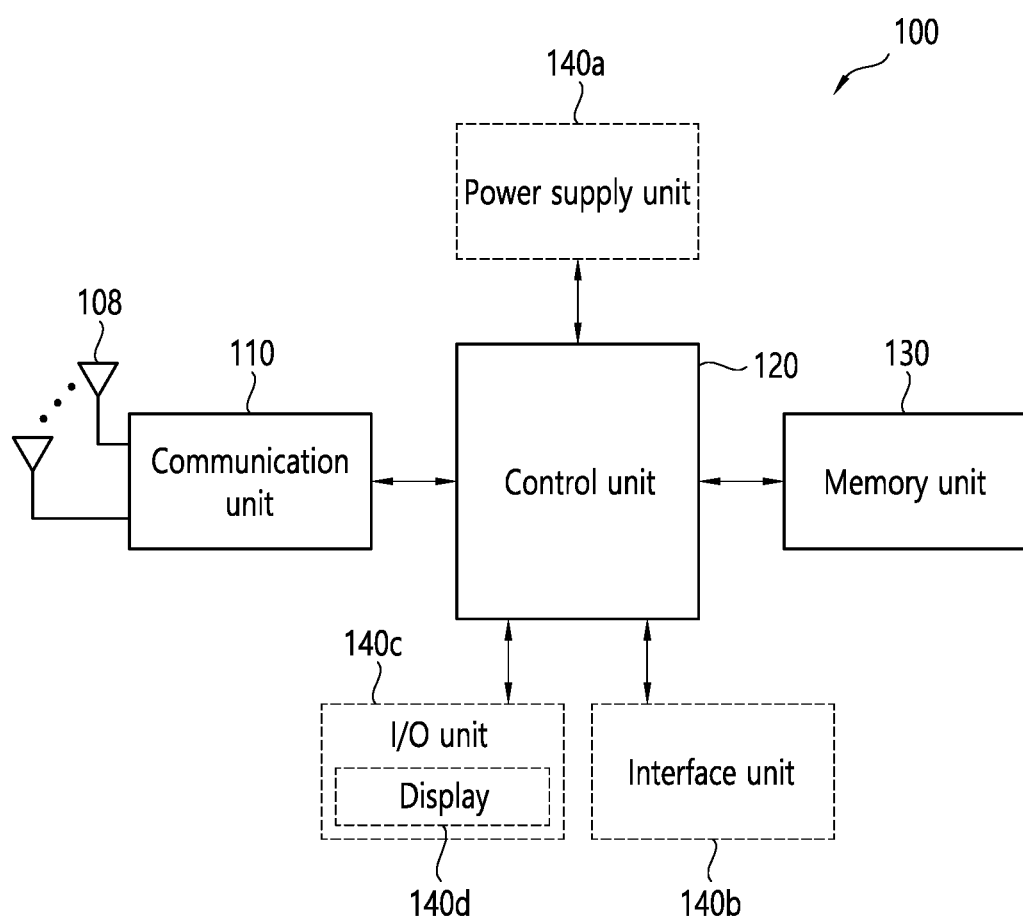
FIG. 28 shows a hand-held device, based on an embodiment of the present disclosure.

FIG. 28 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 29:
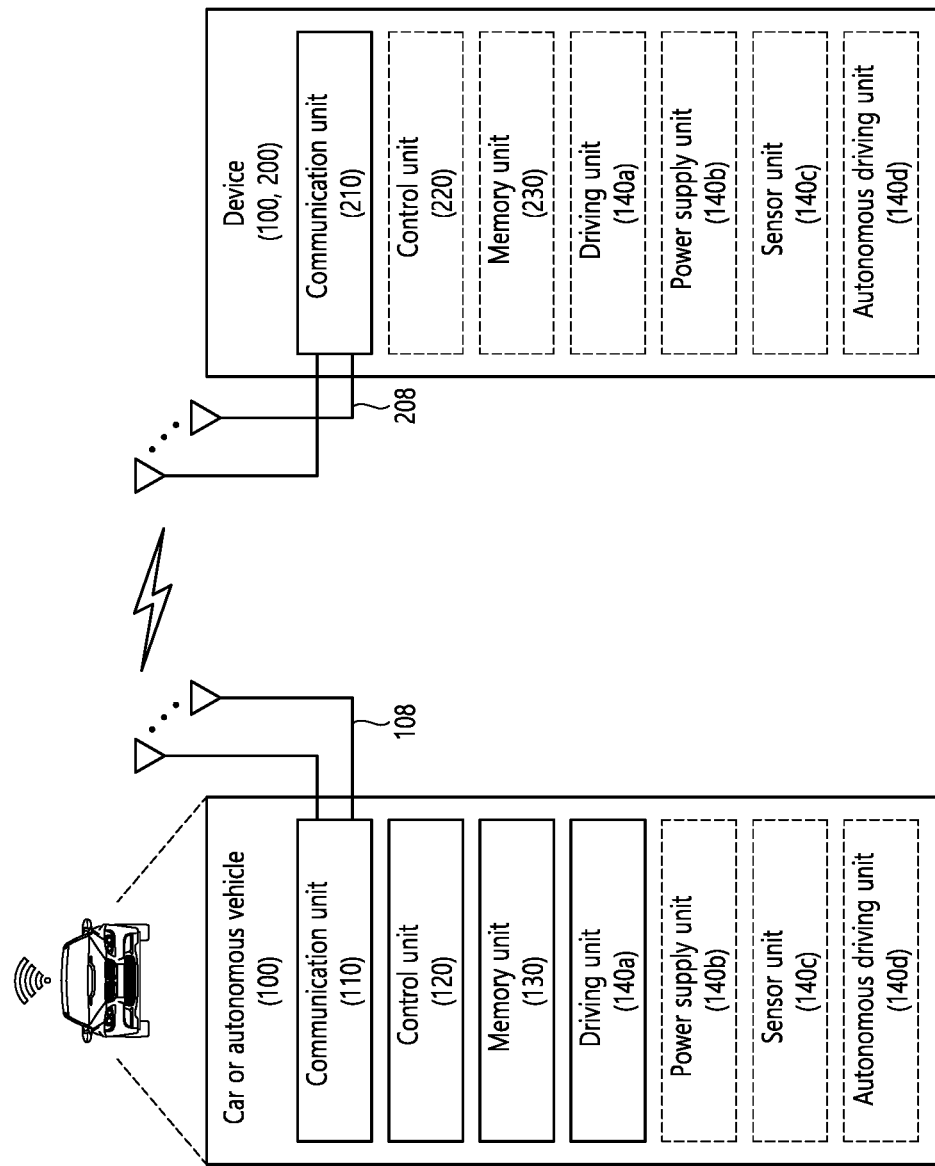
FIG. 29 shows a vehicle or an autonomous vehicle, based on an embodiment of the present disclosure.

FIG. 29 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 29, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication by a first device, the method comprising:
   determining a plurality of first bits to be interleaved among a plurality of bits related to a first encoded code block and a plurality of second bits excluding the plurality of first bits from the plurality of bits related to the first encoded code block;
   performing interleaving for the plurality of first bits;
   transmitting, to a second device, the interleaved plurality of first bits based on a plurality of first resource elements (REs) related to the plurality of first bits; and
   transmitting, to the second device, the plurality of second bits based on a plurality of second REs related to the plurality of second bits,
   wherein a first symbol period that is a symbol period of the plurality of first REs is located after a second symbol period that is a symbol period of the plurality of second REs, or a first symbol in the first symbol period is a same as a last symbol in the second symbol period, and
   wherein, based on the first symbol in the first symbol period being the same as the last symbol in the second symbol period, the plurality of second REs are located in a lower frequency region than the plurality of first REs.

2. The method of claim 1, wherein the plurality of second bits are a plurality of consecutive bits from a least significant bit (LSB) of the encoded code block.

3. The method of claim 1, wherein the plurality of second bits are a plurality of parity bits.

4. The method of claim 3, wherein the plurality of second bits are the plurality of parity bits, based on a redundancy version (RV) which is zero.

5. The method of claim 1, further comprising:
   determining a plurality of third bits to be interleaved among a plurality of bits related to a second encoded code block and a plurality of fourth bits excluding the plurality of third bits from the plurality of bits related to the second encoded code block;
   performing interleaving for the plurality of third bits;
   transmitting, to the second device, the interleaved plurality of third bits based on a plurality of third REs related to the plurality of third bits; and
   transmitting, to the second device, the plurality of fourth bits based on a plurality of fourth REs related to the plurality of fourth bits,
   wherein a third symbol period that is a symbol period of the plurality of third REs is located after a fourth symbol period that is a symbol period of the plurality of fourth REs, or a first symbol in the third symbol period is a same as a last symbol in the fourth symbol period, and
   wherein, based on the first symbol in the third symbol period being the same as the last symbol in the fourth symbol period, the plurality of fourth REs are located in a lower frequency region than the plurality of third REs.

6. The method of claim 5,
   wherein a fifth symbol period including the first symbol period and the third symbol period is located after a sixth symbol period including the second symbol period and the fourth symbol period, or a first symbol in the fifth symbol period is a same as a last symbol in the sixth symbol period, and
   wherein, based on the first symbol in the fifth symbol period being the same as the last symbol in the sixth symbol period, at least one RE among the plurality of second REs and the plurality of fourth REs is located in a lower frequency region than at least one RE among the plurality of first REs and the plurality of third REs.

7. The method of claim 6, wherein a virtual encoded code block is generated based on the plurality of second REs and the plurality of fourth REs.

8. The method of claim 6, wherein the sixth symbol period is included in a symbol period related to automatic gain control (AGC).

9. The method of claim 6, wherein the sixth symbol period is included in a symbol period in which a physical sidelink control channel (PSCCH) is transmitted.

10. The method of claim 1, wherein a number of the plurality of first bits is determined based on at least one of a number of layers for a transport block related to the first encoded code block, a number of bits per a modulation symbol, a number of code blocks included in the transport block, or a total number of coded bits available for the transport block.

11. A first device configured to perform sidelink (SL) communication, the first device comprising:
   at least one memory storing instructions;
   at least one transceiver; and
   at least one processor connected to the at least one memory and the at least one transceiver, wherein the at least one processor executes the instructions to:
   determine a plurality of first bits to be interleaved among a plurality of bits related to a first encoded code block and a plurality of second bits excluding the plurality of first bits from the plurality of bits related to the first encoded code block;
   perform interleaving for the plurality of first bits;
   transmit, to a second device, the interleaved plurality of first bits based on a plurality of first resource elements (REs) related to the plurality of first bits; and
   transmit, to the second device, the plurality of second bits based on a plurality of second REs related to the plurality of second bits,
   wherein a first symbol period that is a symbol period of the plurality of first REs is located after a second symbol period that is a symbol period of the plurality of second REs, or a first symbol in the first symbol period is a same as a last symbol in the second symbol period, and
   wherein, based on the first symbol in the first symbol period being the same as the last symbol in the second symbol period, the plurality of second REs are located in a lower frequency region than the plurality of first REs.

12. An apparatus configured to control a first user equipment (UE), the apparatus comprising:
   at least one processor; and
   at least one memory connected to the at least one processor and storing instructions, wherein the at least one processor executes the instructions to:
   determine a plurality of first bits to be interleaved among a plurality of bits related to a first encoded code block and a plurality of second bits excluding the plurality of first bits from the plurality of bits related to the first encoded code block;
   perform interleaving for the plurality of first bits;
   transmit, to a second UE, the interleaved plurality of first bits based on a plurality of first resource elements (REs) related to the plurality of first bits; and
   transmit, to the second UE, the plurality of second bits based on a plurality of second REs related to the plurality of second bits,
   wherein a first symbol period that is a symbol period of the plurality of first REs is located after a second symbol period that is a symbol period of the plurality of second REs, or a first symbol in the first symbol period is a same as a last symbol in the second symbol period, and
   wherein, based on the first symbol in the first symbol period being the same as the last symbol in the second symbol period, the plurality of second REs are located in a lower frequency region than the plurality of first REs.

13. The first device of claim 11, wherein the plurality of second bits are a plurality of consecutive bits from a least significant bit (LSB) of the encoded code block.

14. The first device of claim 11, wherein the plurality of second bits are a plurality of parity bits.

15. The first device of claim 14, wherein the plurality of second bits are the plurality of parity bits, based on a redundancy version (RV) which is zero.

16. The first device of claim 11, wherein the at least one processor executes the instructions to:
   determine a plurality of third bits to be interleaved among a plurality of bits related to a second encoded code block and a plurality of fourth bits excluding the plurality of third bits from the plurality of bits related to the second encoded code block;
   perform interleaving for the plurality of third bits;
   transmit, to the second device, the interleaved plurality of third bits based on a plurality of third REs related to the plurality of third bits; and
   transmit, to the second device, the plurality of fourth bits based on a plurality of fourth REs related to the plurality of fourth bits,
   wherein a third symbol period that is a symbol period of the plurality of third REs is located after a fourth symbol period that is a symbol period of the plurality of fourth REs, or a first symbol in the third symbol period is a same as a last symbol in the fourth symbol period, and
   wherein, based on the first symbol in the third symbol period being the same as the last symbol in the fourth symbol period, the plurality of fourth REs are located in a lower frequency region than the plurality of third REs.

17. The first device of claim 16,
   wherein a fifth symbol period including the first symbol period and the third symbol period is located after a sixth symbol period including the second symbol period and the fourth symbol period, or a first symbol in the fifth symbol period is a same as a last symbol in the sixth symbol period, and
   wherein, based on the first symbol in the fifth symbol period being the same as the last symbol in the sixth symbol period, at least one RE among the plurality of second REs and the plurality of fourth REs is located in a lower frequency region than at least one RE among the plurality of first REs and the plurality of third REs.

18. The first device of claim 17, wherein a virtual encoded code block is generated based on the plurality of second REs and the plurality of fourth REs.

* * * * *